(12) United States Patent
Perkel et al.

(10) Patent No.: US 7,389,257 B2
(45) Date of Patent: Jun. 17, 2008

(54) SYSTEM AND METHOD FOR AUTOMATED DOCUMENTATION FOR SOLICITED TRADES

(75) Inventors: Rachel Perkel, San Francisco, CA (US); Rosemarie Scafa, Mill Valley, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1547 days.

(21) Appl. No.: 09/877,988

(22) Filed: Jun. 8, 2001

(65) Prior Publication Data

US 2002/0062273 A1    May 23, 2002

Related U.S. Application Data

(60) Provisional application No. 60/252,825, filed on Nov. 22, 2000.

(51) Int. Cl.
    *G06Q 40/00* (2006.01)

(52) U.S. Cl. .................................................. 705/35
(58) Field of Classification Search ............ 705/35–45
    See application file for complete search history.

(56) References Cited

U.S. PATENT DOCUMENTS

2005/0159962 A1\* 7/2005 Weiss et al. .................... 705/1

OTHER PUBLICATIONS

Authers, PaineWebber to launch online trading, Financial Times.\*

\* cited by examiner

*Primary Examiner*—Richard Weisberger
(74) *Attorney, Agent, or Firm*—Townsend and Townsend and Crew LLP

(57) ABSTRACT

A system and method are provided that allow for automated documentation of all advice interactions between broker representatives on one end and clients, or prospective clients, on the other. This is accomplished by providing a computer system for storing appropriate data for each advice interaction with a client. The advice interaction data can be used to assess compliance with existing regulations, as well as for analytical and training purposes.

20 Claims, 34 Drawing Sheets

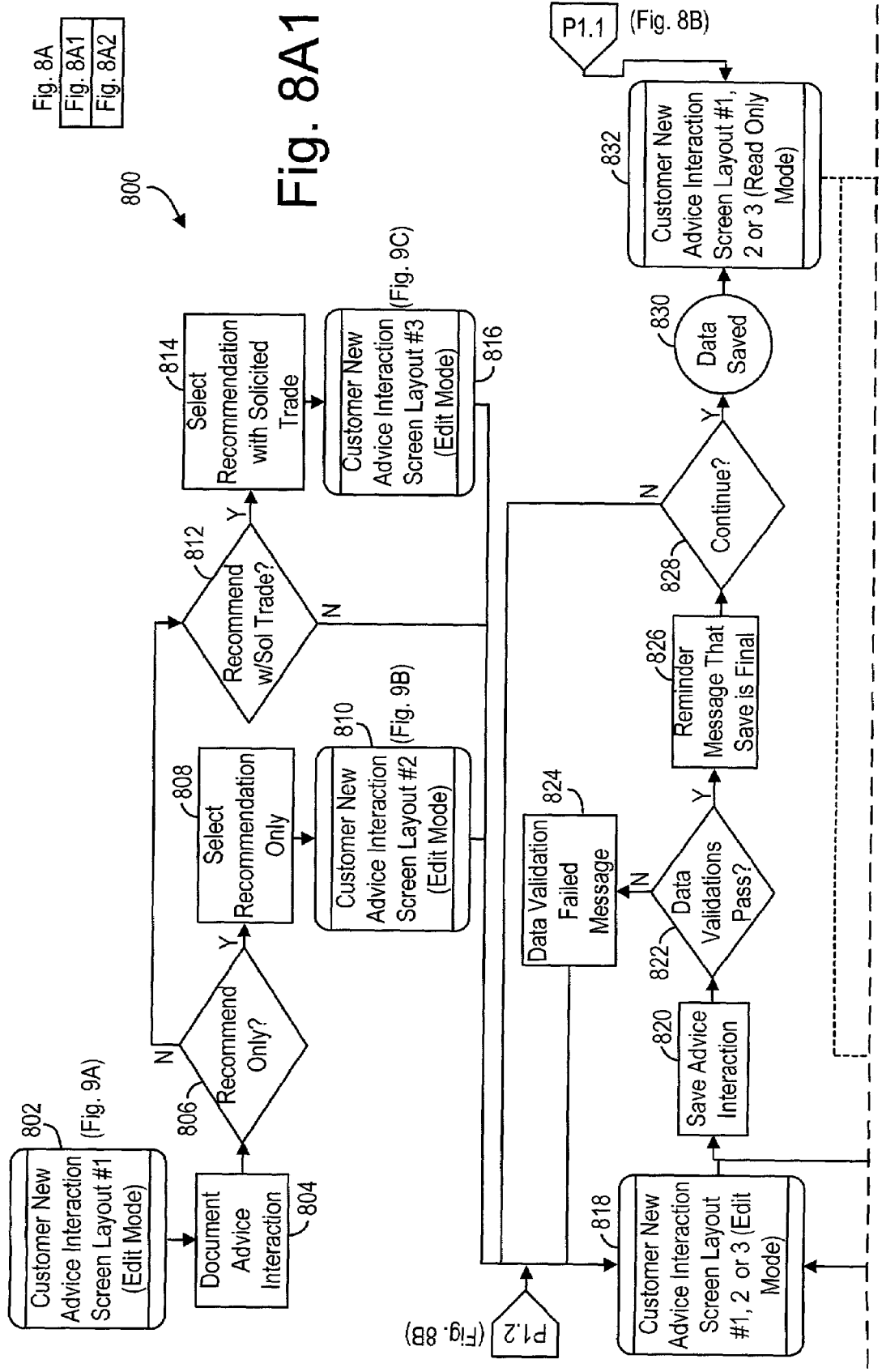

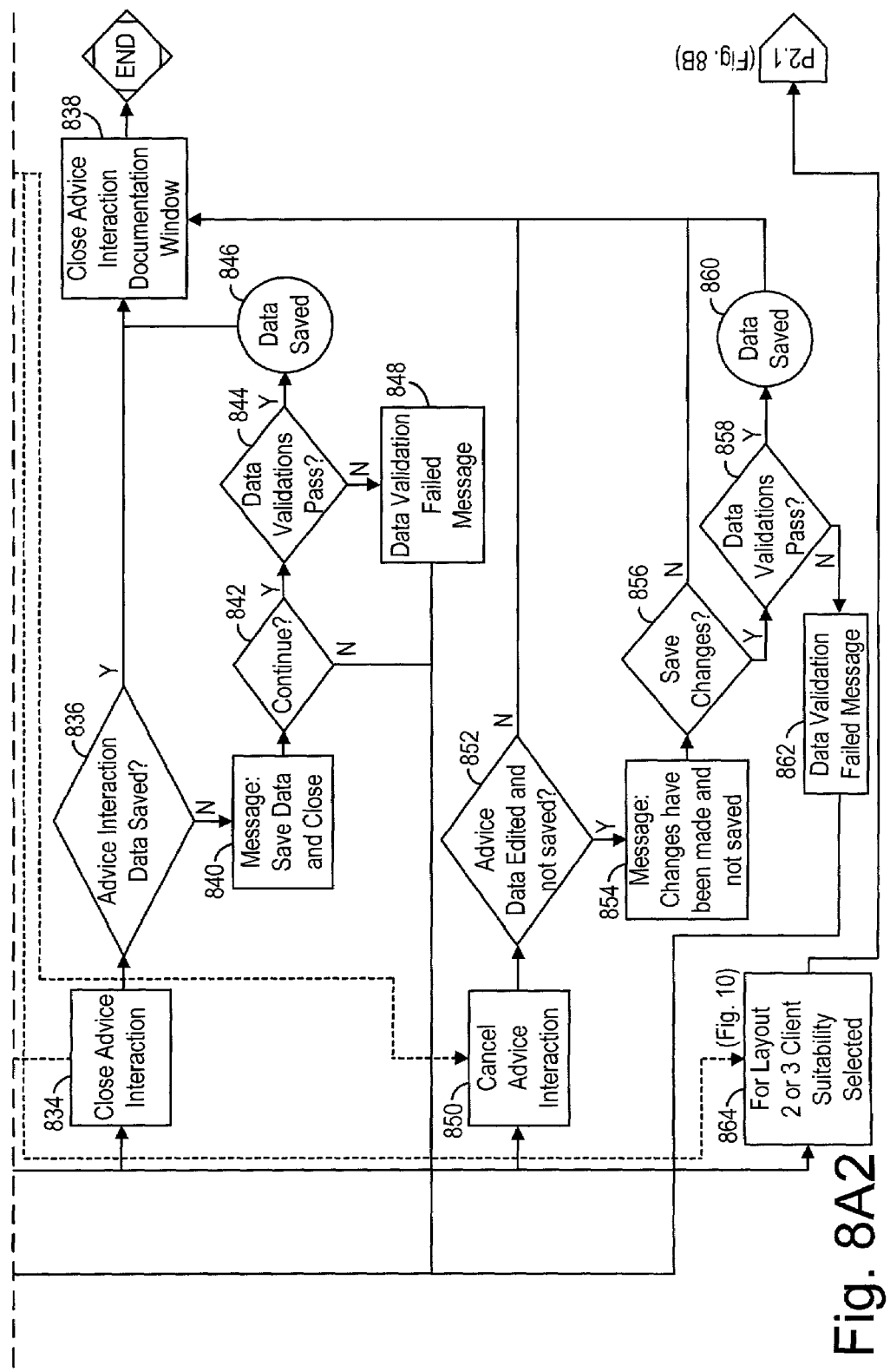
Fig. 8A2

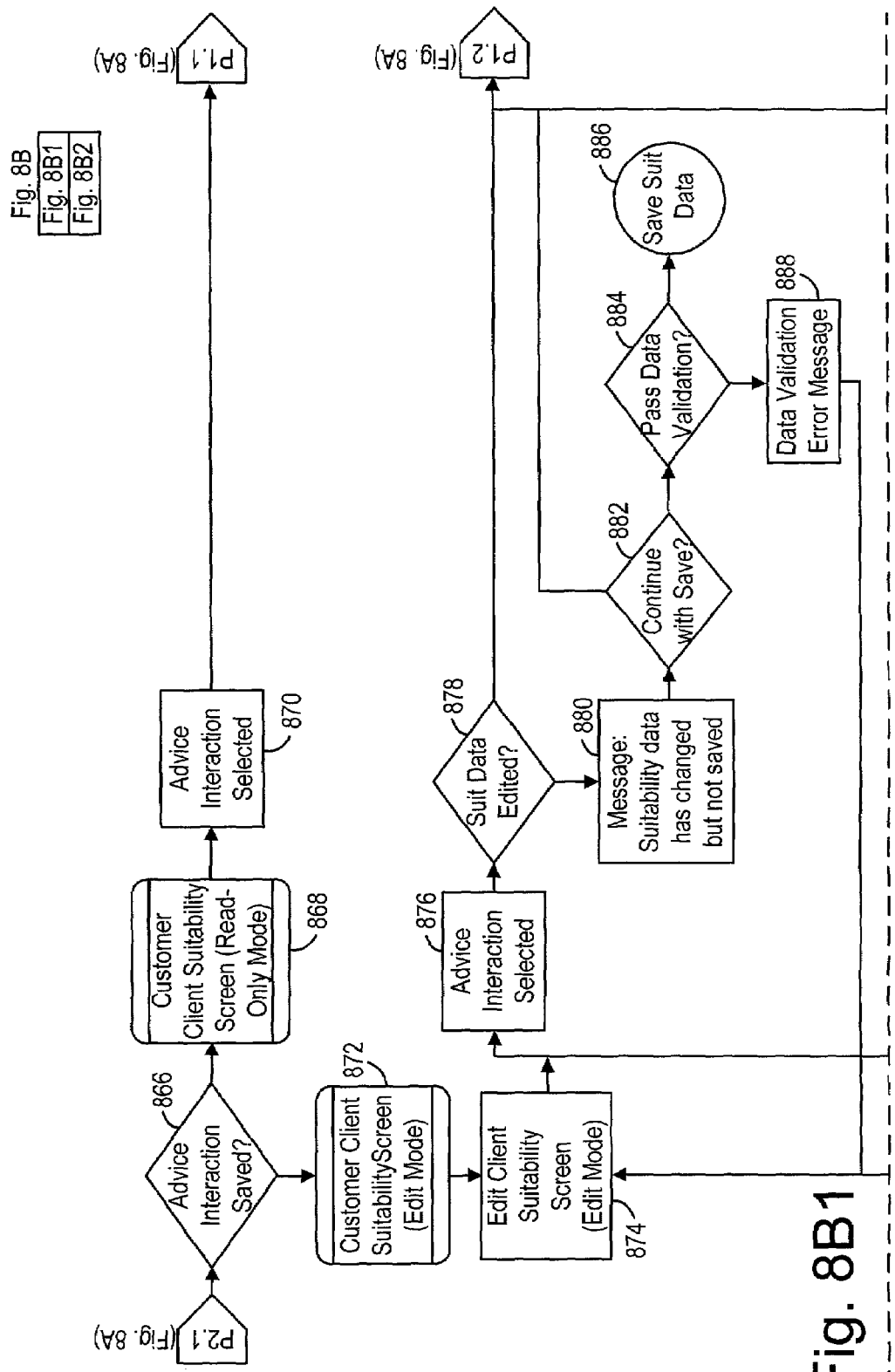

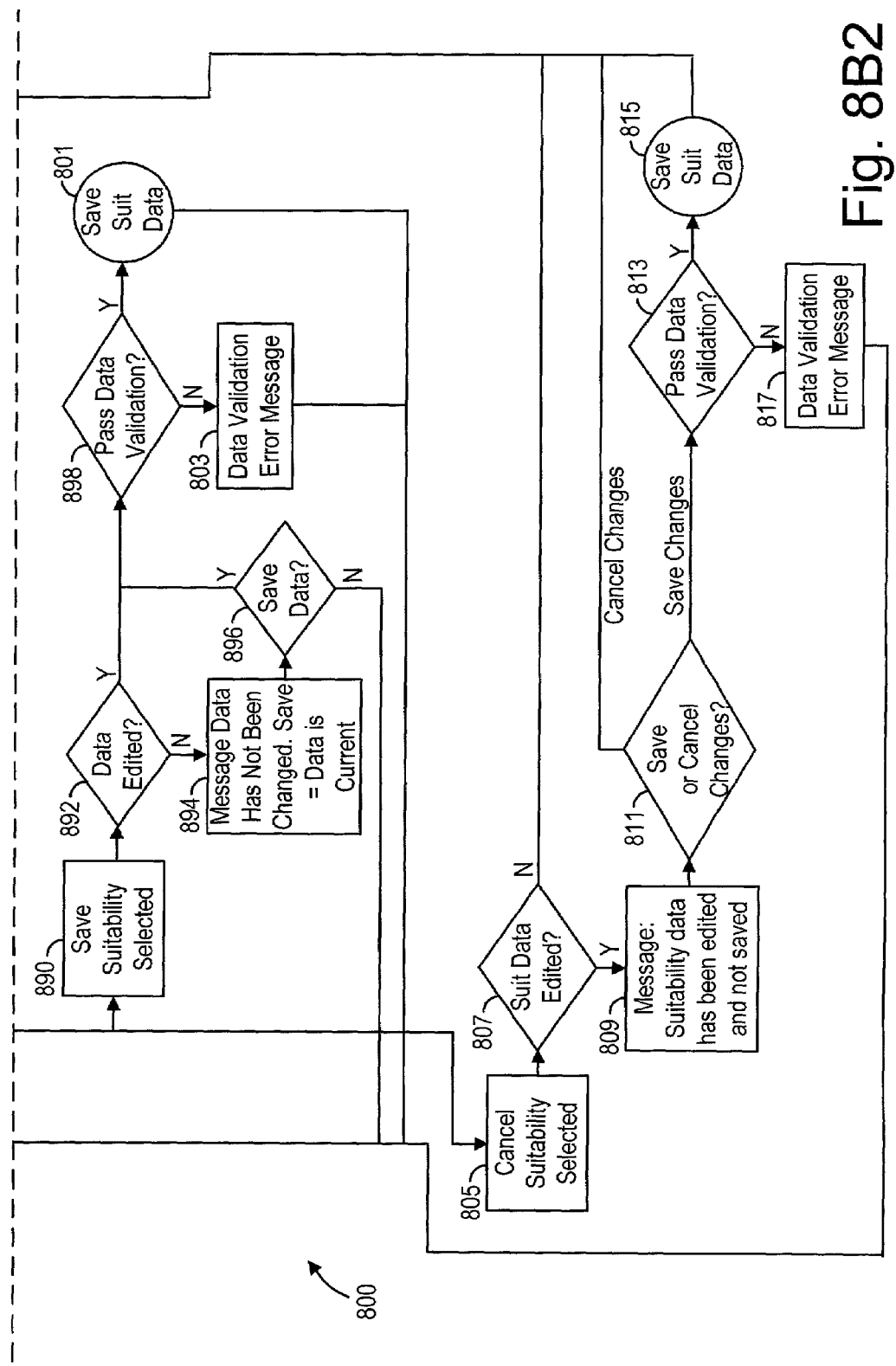

New Advice Interaction: Customer

Suitability   Save   Close   Cancel

Rep Beta Sign On RDRO   Group/Team   [Select One ▽]

Client Name

Scafa        Rosemarie    X         [          ] Client Representative
Last         First        Initial

Advice Interaction Detail

Date of Interaction

Referral: AdvisorSource (SAS)

☐ Investment Manager    ☐ Financial Planner    ☐ Trust/Estate Attorney    ☐ CPA

Referral: Internal

☐ Fixed Income    ☐ Options    ☐ Other

Tool

☐ Portfolio Checkup    ☐ Personal Financial Plan    ☐ BIP

Education

☐ Asset Allocation    ☐ Core and Explore    ☐ Individual Guidance    ☐ Goal Planning

Recommendation

☐ Recommendation(s) Only    ☐ Recommendation(s) With Solicited Trade(s) Placed

Recommendation(s) were discussed with the following person [Select One ▽]

Client Assessment: Recommendation(s) Only

Please review Suitability information pertinent to this Client Assessment and update if warranted.

☐ Suitability data has been reviewed

Securities Recommended

For securities that not have a ticker symbol, please enter the Security Number in the Ticker Symbol field.

| | Recommendation | | Ticker Symbol |
|---|---|---|---|
| 1. | ◯ Buy | ◯ Sell | ☐ |
| 2. | ◯ Buy | ◯ Sell | ☐ |
| 3. | ◯ Buy | ◯ Sell | ☐ |
| 4. | ◯ Buy | ◯ Sell | ☐ |
| 5. | ◯ Buy | ◯ Sell | ☐ |
| 6. | ◯ Buy | ◯ Sell | ☐ |
| 7. | ◯ Buy | ◯ Sell | ☐ |
| 8. | ◯ Buy | ◯ Sell | ☐ |
| 9. | ◯ Buy | ◯ Sell | ☐ |
| 10. | ◯ Buy | ◯ Sell | ☐ |
| 11. | ◯ Buy | ◯ Sell | ☐ |
| 12. | ◯ Buy | ◯ Sell | ☐ |

Basis For Recommendation

☐ Initial Investment Strategy

☐ Asset Allocation Adjustment

☐ Change in Client Goals and/or Objectives

☐ Change in Client Risk Tolerance and/or Time Frame

☐ Change in Client Financial Situation

☐ Concentrated Equity Position

☐ Other (Please explain below)

[ text box ]

Other Material Information (optional)

[ text box ]

Fig. 9C1

Securities Recommended

For securities that do not have a ticker symbol, please enter the Security Number in the Ticker Symbol field.

| | Recommendation | | Ticker Symbol | Solicited Trade Placed | Account Number |
|---|---|---|---|---|---|
| 1. | ○ Buy | ○ Sell | [　　　] | ○ Yes ○ No | [ ---Select One--- ▼ ] |
| 2. | ○ Buy | ○ Sell | [　　　] | ○ Yes ○ No | [ ---Select One--- ▼ ] |
| 3. | ○ Buy | ○ Sell | [　　　] | ○ Yes ○ No | [ ---Select One--- ▼ ] |
| 4. | ○ Buy | ○ Sell | [　　　] | ○ Yes ○ No | [ ---Select One--- ▼ ] |
| 5. | ○ Buy | ○ Sell | [　　　] | ○ Yes ○ No | [ ---Select One--- ▼ ] |
| 6. | ○ Buy | ○ Sell | [　　　] | ○ Yes ○ No | [ ---Select One--- ▼ ] |
| 7. | ○ Buy | ○ Sell | [　　　] | ○ Yes ○ No | [ ---Select One--- ▼ ] |
| 8. | ○ Buy | ○ Sell | [　　　] | ○ Yes ○ No | [ ---Select One--- ▼ ] |
| 9. | ○ Buy | ○ Sell | [　　　] | ○ Yes ○ No | [ ---Select One--- ▼ ] |
| 10. | ○ Buy | ○ Sell | [　　　] | ○ Yes ○ No | [ ---Select One--- ▼ ] |
| 11. | ○ Buy | ○ Sell | [　　　] | ○ Yes ○ No | [ ---Select One--- ▼ ] |
| 12. | ○ Buy | ○ Sell | [　　　] | ○ Yes ○ No | [ ---Select One--- ▼ ] |

Basis For Recommendation

☐ Initial Investment Strategy

☐ Asset Allocation Adjustment

☐ Change in Client Goals and/or Objectives

☐ Change in Client Risk Tolerance and/or Time Frame

☐ Change in Client Financial Situation

☐ Concentrated Equity Position

☐ Other (Please explain below)

[　　　　　　　　　　　　]

Other Material Information (optional)

[　　　　　　　　　　　　]

Client Suitability: Customer  Advice Interaction  Save  Cancel

Client Profile

Name
Scafa       Rosemarie       X           Birth Date
Last        First           Initial Occupation           Marital Status                    No. of Dependents
                     ---Select One---

Financial Profile  Last Updated: 10/01/1999

Federal Tax Rate (%)       Annual Income ($000's)       Liquid Net Worth ($000's)
---Select One---           ---Select One---             ---Select One---

Total Net Worth ($000's)   Overall Knowledge            Overall Experience
---Select One---           ---Select One---             ---Select One---

Account Investment Objectives
Client Investment Objectives for the following Accounts 12345678   ☐ Capital Preservation   ☐ Income   ☐ Growth   ☐ Speculation
73558963   ☐ Capital Preservation   ☐ Income   ☐ Growth   ☐ Speculation
90472214   ☐ Capital Preservation   ☐ Income   ☐ Growth   ☐ Speculation

Fig. 10A

Client Suitability: Customer

Advice Interaction     Save     Cancel

Client Profile

Name
Scafa    Rosemarie    X
Last     First     Initial

Birth Date
12/17/1960

Occupation [ ]     Marital Status [---Select One---▸]     No. of Dependents [ ]

Financial Profile
Last Updated: 10/01/1999

Federal Tax Rate (%) [---Select One---▸]     Annual Income ($000's) [---Select One---▸]     Liquid Net Worth ($000's) [---Select One---▸]     Total Net Worth ($000's) [---Select One---▸]

Name
Smith    Sam    A
Last     First     Initial

Role
Custodian

Overall Knowledge [---Select One---▸]     Overall Experience [---Select One---▸]

Account Investment Objectives
Client Investment Objectives for the following Accounts

| | | | | |
|---|---|---|---|---|
| 12345678 | ☐ Capital Preservation | ☐ Income | ☐ Growth | ☐ Speculation |
| 73558963 | ☐ Capital Preservation | ☐ Income | ☐ Growth | ☐ Speculation |

Fig. 10B

Client Suitability: Customer    Advice Interaction    Save    Cancel

Client Profile

Name
Scafa    Rosemarie    X    Birth Date
Last    First    Initial    12/17/1960

Occupation    Marital Status    No. of Dependents
[ ]    [---Select One---▸]

Financial Profile
Last Updated: 10/01/1999

Federal Tax Rate (%)    Annual Income ($000's)    Liquid Net Worth ($000's)    Total Net Worth ($000's)
[---Select One---▸]    [---Select One---▸]    [---Select One---▸]    [---Select One---▸]

Client Profile

Name
Smith    Sam    A    Birth Date
Last    First    Initial

Occupation    Marital Status    No. of Dependents
[ ]    [---Select One---▸]

Financial Profile
Last Updated: 10/01/1999

Federal Tax Rate (%)    Annual Income ($000's)    Liquid Net Worth ($000's)    Total Net Worth ($000's)
[---Select One---▸]    [---Select One---▸]    [---Select One---▸]    [---Select One---▸]

Overall Knowledge    Overall Experience
[---Select One---▸]    [---Select One---▸]

Account Investment Objectives
Client Investment Objectives for the following Accounts 12345678    ☐ Capital Preservation    ☐ Income    ☐ Growth    ☐ Speculation
73558963    ☐ Capital Preservation    ☐ Income    ☐ Growth    ☐ Speculation

Fig. 10C

Client Suitability: Customer

Advice Interaction     Save     Cancel

Client Profile

Organization Name
Money is Fun Investment Club

Established Date
12/17/1960

Financial Profile    Last Updated: 10/01/1999

| Gross Revenue ($000') | Net Revenue ($000's) | Liquid Net Worth ($000's) | Total Net Worth ($000's) |
|---|---|---|---|
| ---Select One--- | ---Select One--- | ---Select One--- | ---Select One--- |

Name
Smith    Sam
Last      First

A
Initial

Role
First Listed Agent

Overall Knowledge
---Select One---

Overall Experience
---Select One---

Account Investment Objectives

Client Investment Objectives for the following Accounts

12345678    ☐ Capital Preservation    ☐ Income    ☐ Growth    ☐ Speculation

Fig. 10D

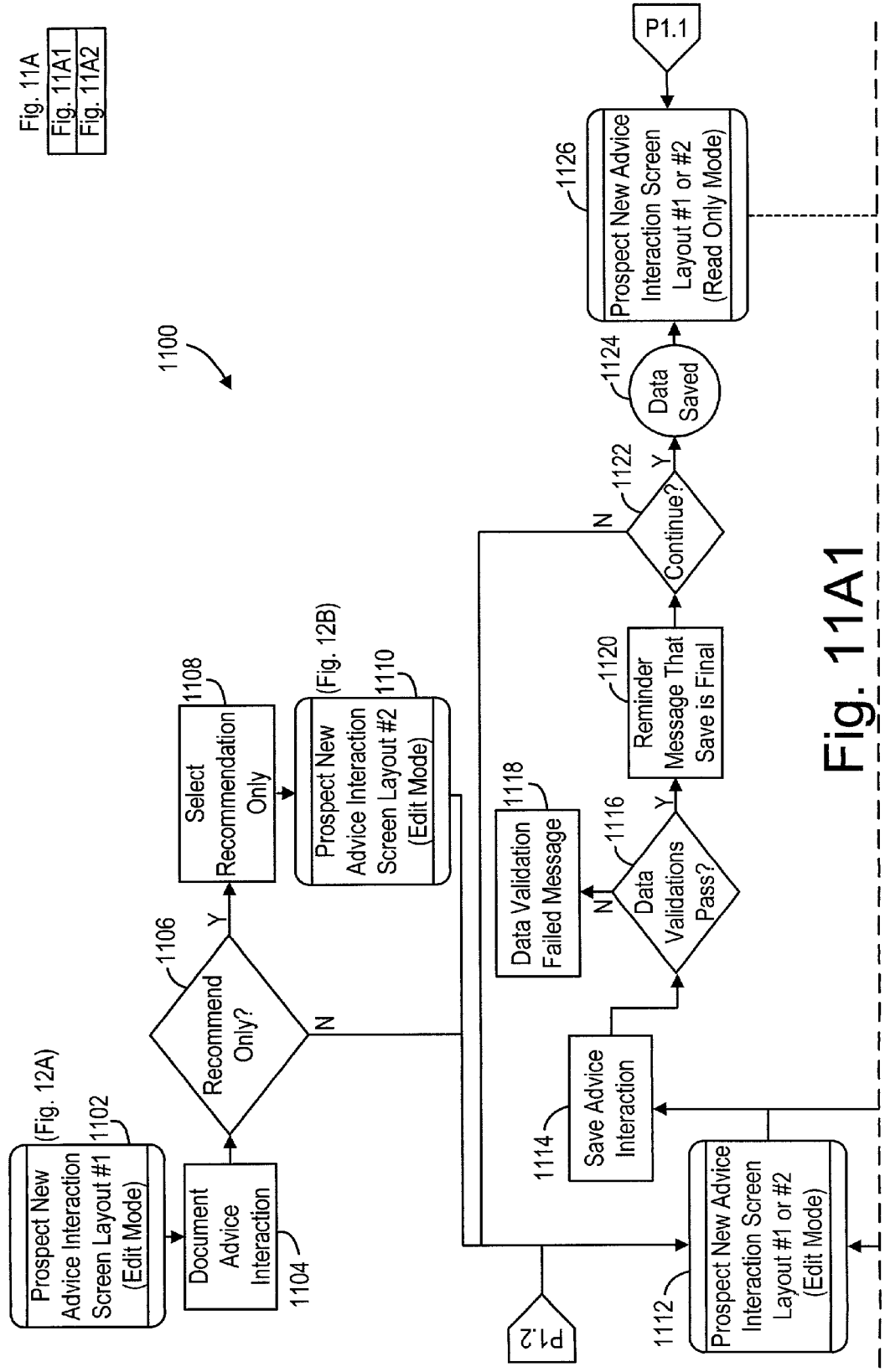

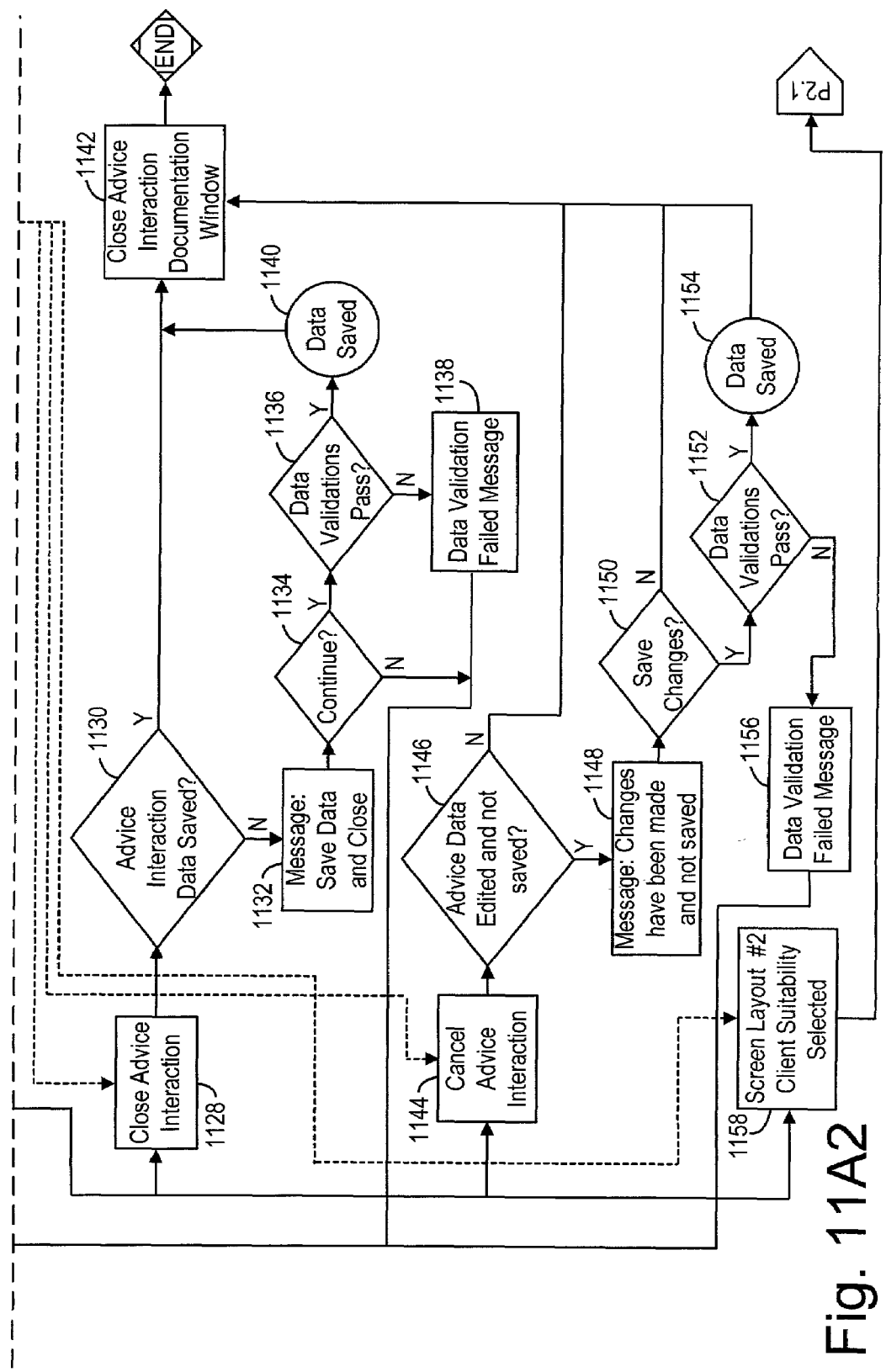
Fig. 11A2

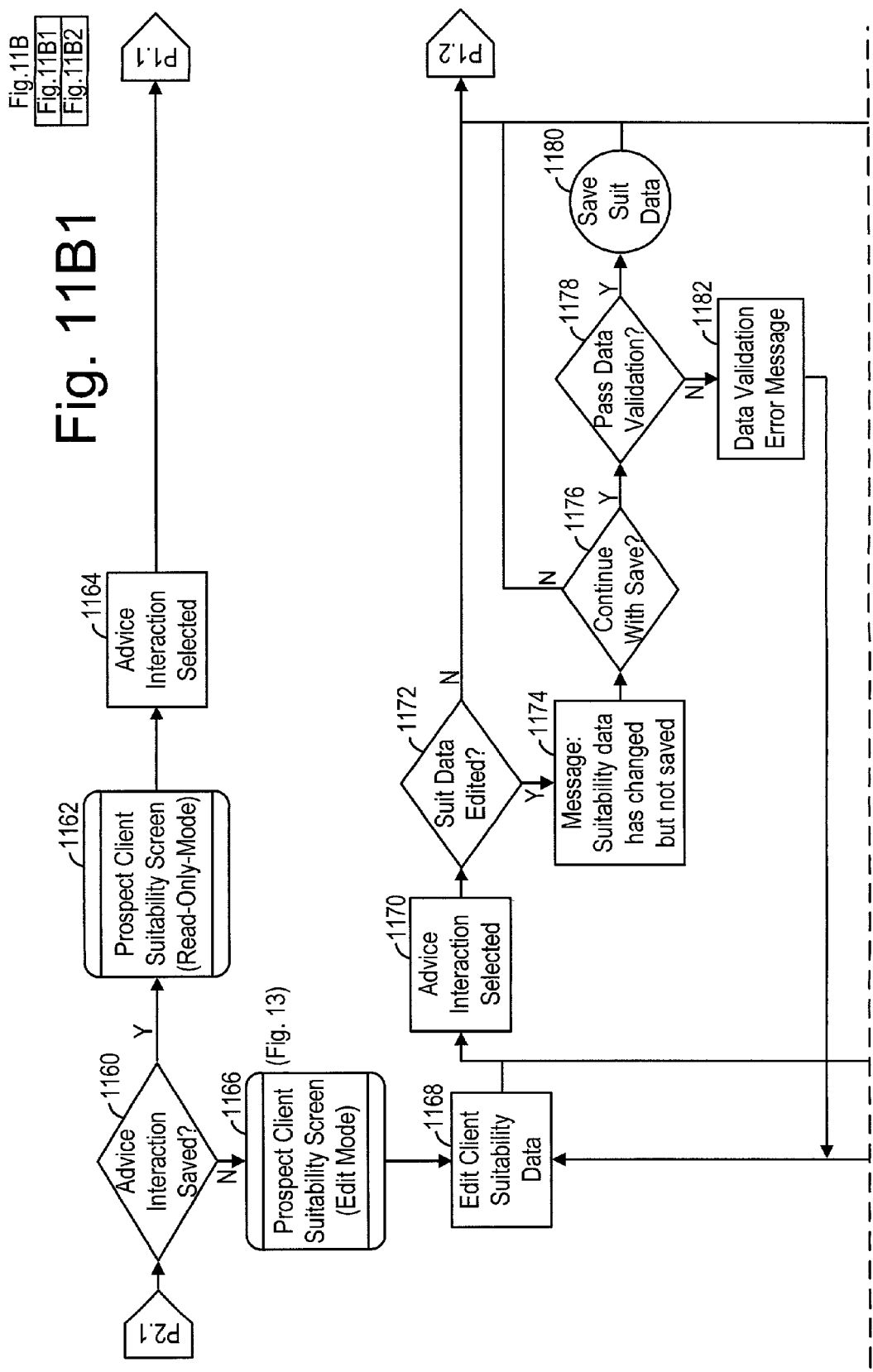
Fig. 11B1

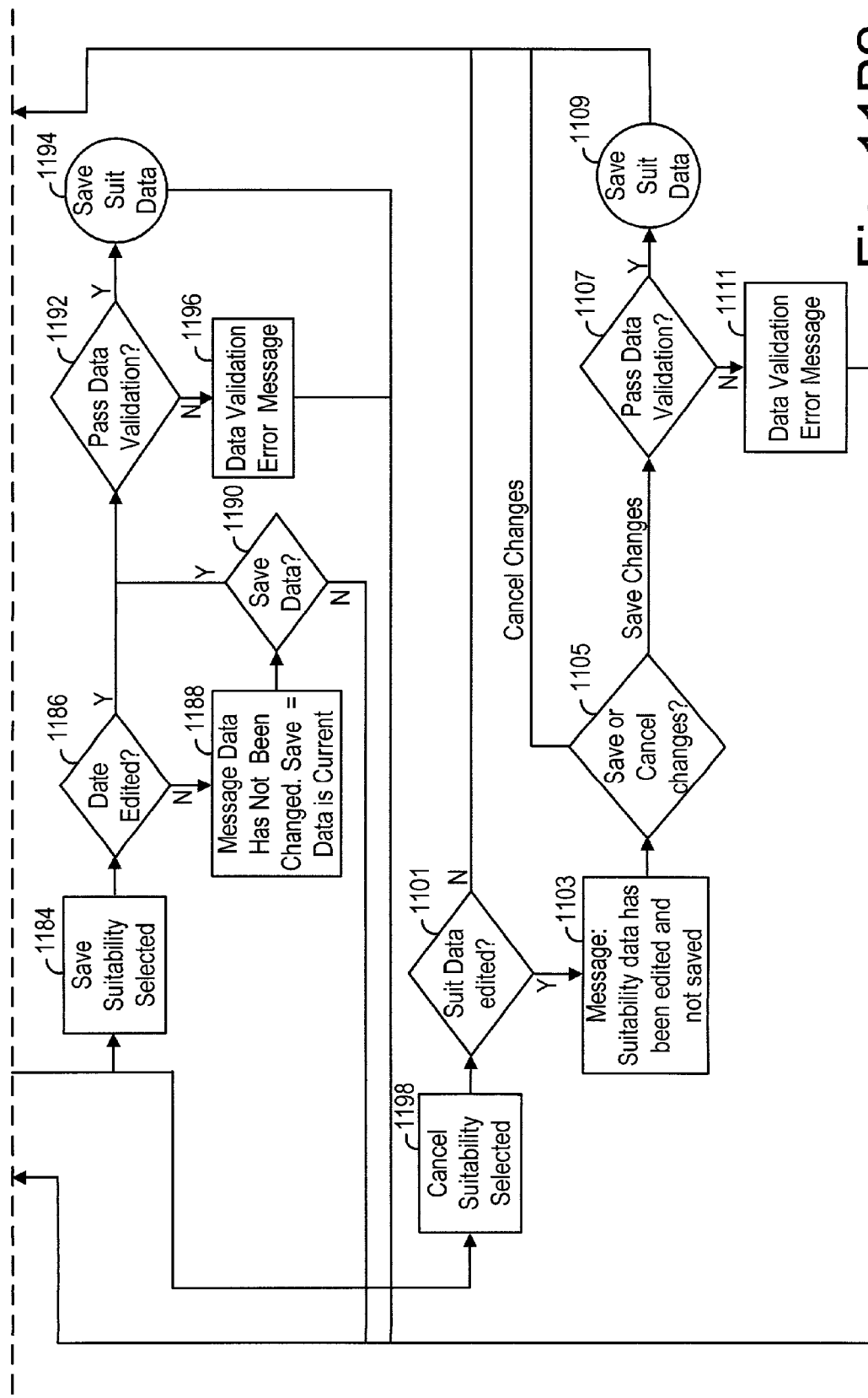
Fig. 11B2

New Advice Interaction: Prospect

| | | | Save Close Cancel |
|---|---|---|---|

Rep Beta Sign On  RDRO    Group/Team
Client Name
Scafa           Rosemarie        X
Last            First            Initial          Select One ▽

Date of Interaction
                                                  [         ]

Advice Interaction Detail

Referral: AdvisorSource (SAS)
☐ Investment Manager    ☐ Financial Planner    ☐ Trust/Estate Attorney    ☐ CPA Referral: Internal
☐ Fixed Income          ☐ Options              ☐ Other

Tool
☐ Portfolio Checkup     ☐ Personal Financial Plan    ☐ BIP

Education
☐ Asset Allocation      ☐ Core and Explore     ☐ Individual Guidance    ☐ Goal Planning

Recommendation
☐ Recommendation(s) Only

New Advice Interaction: Prospect

Suitability    Save    Close    Cancel

Rep Beta Sign On RDRO    Group/Team

Client Name

Scafa     Rosemarie     X
Last        First          Initial

Advice Interaction Detail

Select One ▾     Date of Interaction [ ]

Referral: AdvisorSource (SAS)
☐ Investment Manager    ☐ Financial Planner    ☐ Trust/Estate Attorney    ☐ CPA

Referral: Internal
☐ Fixed Income    ☐ Options    ☐ Other

Tool
☐ Portfolio Checkup    ☐ Personal Financial Plan    ☐ BIP

Education
☐ Asset Allocation    ☐ Core and Explore    ☐ Individual Guidance    ☐ Goal Planning

Recommendation
☐ Recommendation(s) Only

Client Assessment: Recommendation(s) Only

Please review Suitability information pertinent to this Client Assessment and update if waranted.

☐ Suitability data has been reviewed

Securities Recommended
For securities that do not have a ticker symbol, please enter the Security Number in the Ticker Symbol field.

| | Recommendation | | Ticker Symbol |
|---|---|---|---|
| 1. | ○ Buy | ○ Sell | ☐ |
| 2. | ○ Buy | ○ Sell | ☐ |
| 3. | ○ Buy | ○ Sell | ☐ |
| 4. | ○ Buy | ○ Sell | ☐ |
| 5. | ○ Buy | ○ Sell | ☐ |
| 6. | ○ Buy | ○ Sell | ☐ |
| 7. | ○ Buy | ○ Sell | ☐ |
| 8. | ○ Buy | ○ Sell | ☐ |
| 9. | ○ Buy | ○ Sell | ☐ |
| 10. | ○ Buy | ○ Sell | ☐ |
| 11. | ○ Buy | ○ Sell | ☐ |
| 12. | ○ Buy | ○ Sell | ☐ |

Fig. 12B1B

Basis For Recommendation
☐ Initial Investment Strategy
☐ Asset Allocation Adjustment
☐ Change in Client Goals and/or Objectives
☐ Change in Client Risk Tolerance and/or Time Frame
☐ Change in Client Financial Situation
☐ Concentrated Equity Position
☐ Other (Please explain below)
Other Material Information (optional)
1200
Fig.12B2

Client Suitability: Prospect   Advice Interaction   Save   Cancel

Client Profile

Name

Scafa   Rosemarie   X
Last    First        Initial

Occupation

Marital Status

---Select One---

Birth Date

No. of Dependents

Financial Profile   Last Updated: 10/01/1999

Federal Tax Rate (%)

---Select One---

Annual Income ($000's)

---Select One---

Liquid Net Worth ($000's)

---Select One---

Total Net Worth ($000's)

---Select One---

Overall Knowledge

---Select One---

Overall Experience

---Select One---

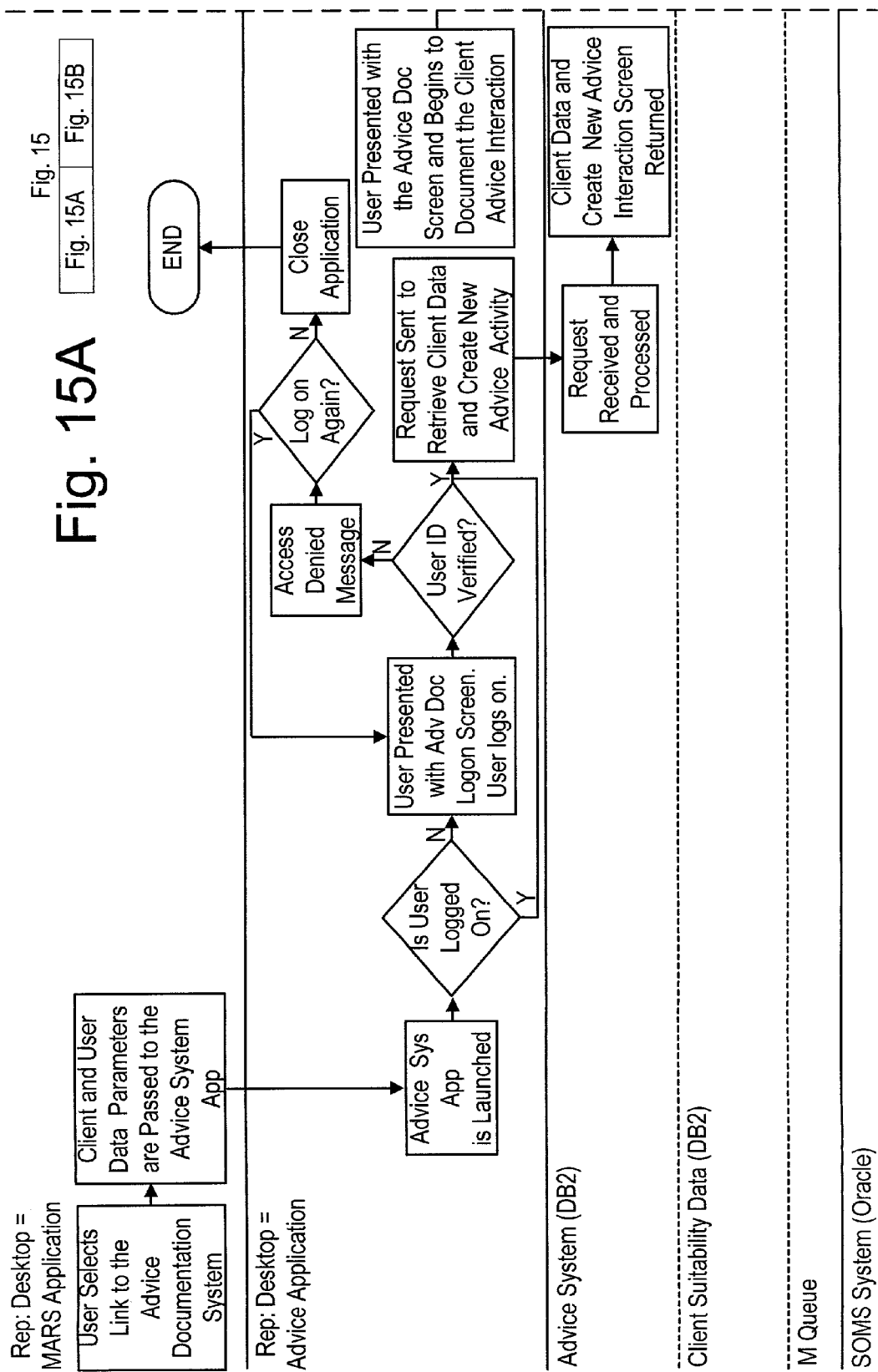

SYSTEM AND METHOD FOR AUTOMATED DOCUMENTATION FOR SOLICITED TRADES

CROSS-REFERENCE TO RELATED APPLICATIONS

This application claims the benefit of the filing date of Provisional Application No. 60/252,825 filed on Nov. 22, 2000.

BACKGROUND OF THE INVENTION

1. Field of the Invention

The present invention relates generally to on-line securities trading and, more particularly, to solicited securities transactions.

2. Related Art

Traditionally, full-service securities brokers have offered advice to clients on conducting specific transactions (e.g. purchase stock X, sell stock Y, etc.). When a client places an order with a broker in response to an advice interaction with the broker, the resulting trade is deemed a "solicited trade." Solicited trades are subject to specific regulations by regulatory agencies such as the SEC. By contrast, non-full service securities brokers (sometime referred to as "discount brokers") have traditionally shied away from providing advice to customers that would give rise to solicited trades. In such situations, the client is given access to research tools, but no specific recommendations are imparted by the brokers to the client.

In the traditional full-service brokerage scenario compliance with regulations pertaining to solicited trades is accomplished by assigning a specific broker representative to interact with each client. In such situations the broker representative is responsible for adhering to the regulations with the assistance of compliance officers.

The increasing popularity of trading securities on-line, on the other hand, has made it desirable for non full-service brokers to offer advice to clients through a variety of channels that may trigger the applicability of solicited trade regulations. In such situations, however, no individual broker representative is responsible for interacting with a specific client. As a result, there is a need for an alternative means of ensuring compliance with applicable solicited trade regulations.

SUMMARY OF THE INVENTION

The system and method of the present invention allow for automated documentation of all advice interactions between broker representatives on one end and clients, or prospective clients, on the other. This is accomplished by providing a computer system for storing appropriate data for each advice interaction with a client. The advice interaction data can be used to assess compliance with existing regulations, as well as for analytical and training purposes.

BRIEF DESCRIPTION OF THE DRAWINGS

FIGS. 8A and 8B are a flow diagram of the operation of an advice interaction system, in accordance to some embodiments of the present invention, for a customer.

FIGS. 9A, 9B1, 9B2, 9C1 and 9C2 illustrate various configurations of a customer advice interaction screen, in accordance to some embodiments of the present invention.

FIGS. 10A-D illustrate a client suitability screen, in accordance to some embodiments of the present invention.

FIGS. 11A and 11B are a flow diagram of the operation of an advice interaction system, in accordance to some embodiments of the present invention, for a prospect.

FIGS. 12A, 12B1 and 12B2 illustrate new advice interaction screens in accordance to some embodiments of the present invention.

FIG. 13 illustrates a prospect suitability screen, in accordance to some embodiments of the present invention.

DETAILED DESCRIPTION OF THE INVENTION

Figure 1:
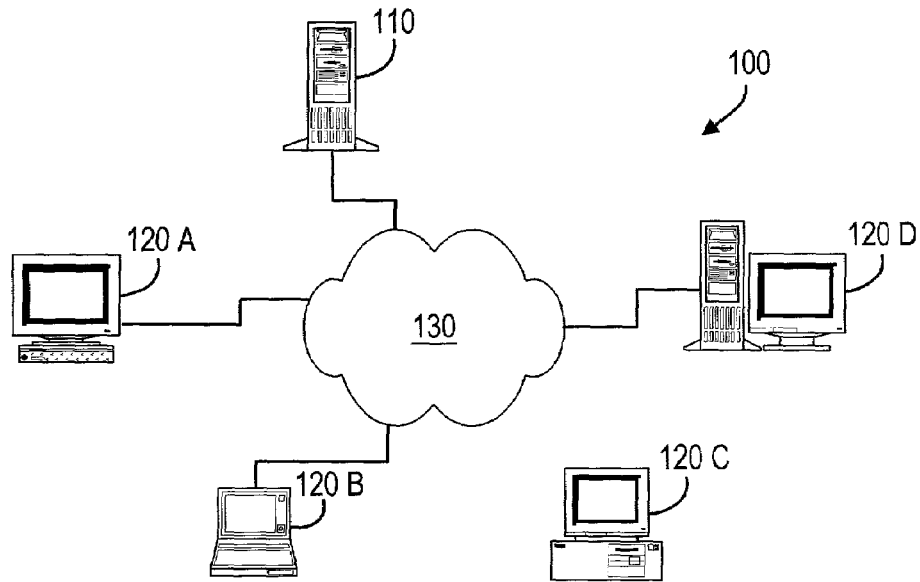
FIG. 1 is a block diagram of a computer system, in accordance with an embodiment of the invention.

A computer system 100, in accordance to an embodiment of the invention, is shown in FIG. 1. Computer system 100 includes a server computer 110 connected to a plurality of client computers 120n (where n=A, B, C, etc.) through a computer network 130.

Figure 2A:
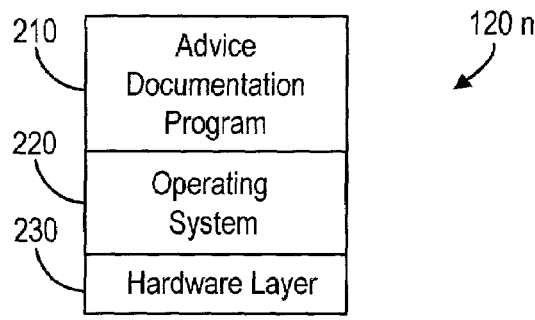
FIG. 2A is a block diagram illustrating the hardware/software structure of a client computer of FIG. 1.

FIG. 2A illustrates the hardware/software structure of a client computer 120n. During operation of computer system 100, an advice documentation program 210 is executed on top of operating system 220, which in turn controls hardware layer 230. Hardware layer 230, in turn, provides a physical connection to computer network 130.

Figure 2B:
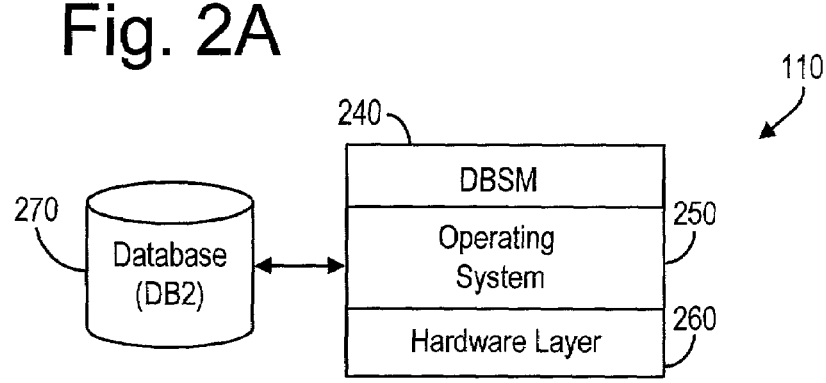
FIG. 2B is a block diagram illustrating the hardware/software structure of a server computer of FIG. 1.

FIG. 2B illustrates the hardware/software structure of server computer 110. During operation of computer system 100, database management software (DBMS) 240 is executed on top of operating system 250, which in turn controls hardware layer 260. Hardware layer 260, in turn, provides a physical connection to global-area network 130. DBMS 240 also stores and retrieves information in database 270 via operating system 250. Database 270 can be any type of commercially available database such as DB2 or an Oracle database.

Server computer 110 can be any special or general purpose computer suitable for maintaining a website such as a Pentium-based computer, available from a variety of third parties, an UltraSparc workstation, available from Sun Microsystems, Inc. of Mountain View, Calif., an RS6000 workstation, available from IBM of New York, etc.

Client computers 120n can be any special or general purpose computer suitable for accessing a website over the Internet, such as any a Pentium-based computer, available from a variety of third parties, a Macintosh computer, available from Apple Computer, Inc. of Cupertino, Calif., etc.

Operating systems 220 and 250 are any suitable operating system for controlling client computers 120n and server computer 110 such as Windows98, Windows NT 4.0 or Windows2000, available from Microsoft Corp. of Redmond, Wash., MacOS 9, available from Apple Computer, Inc., any version of the Unix operating system, etc.

Figure 3:
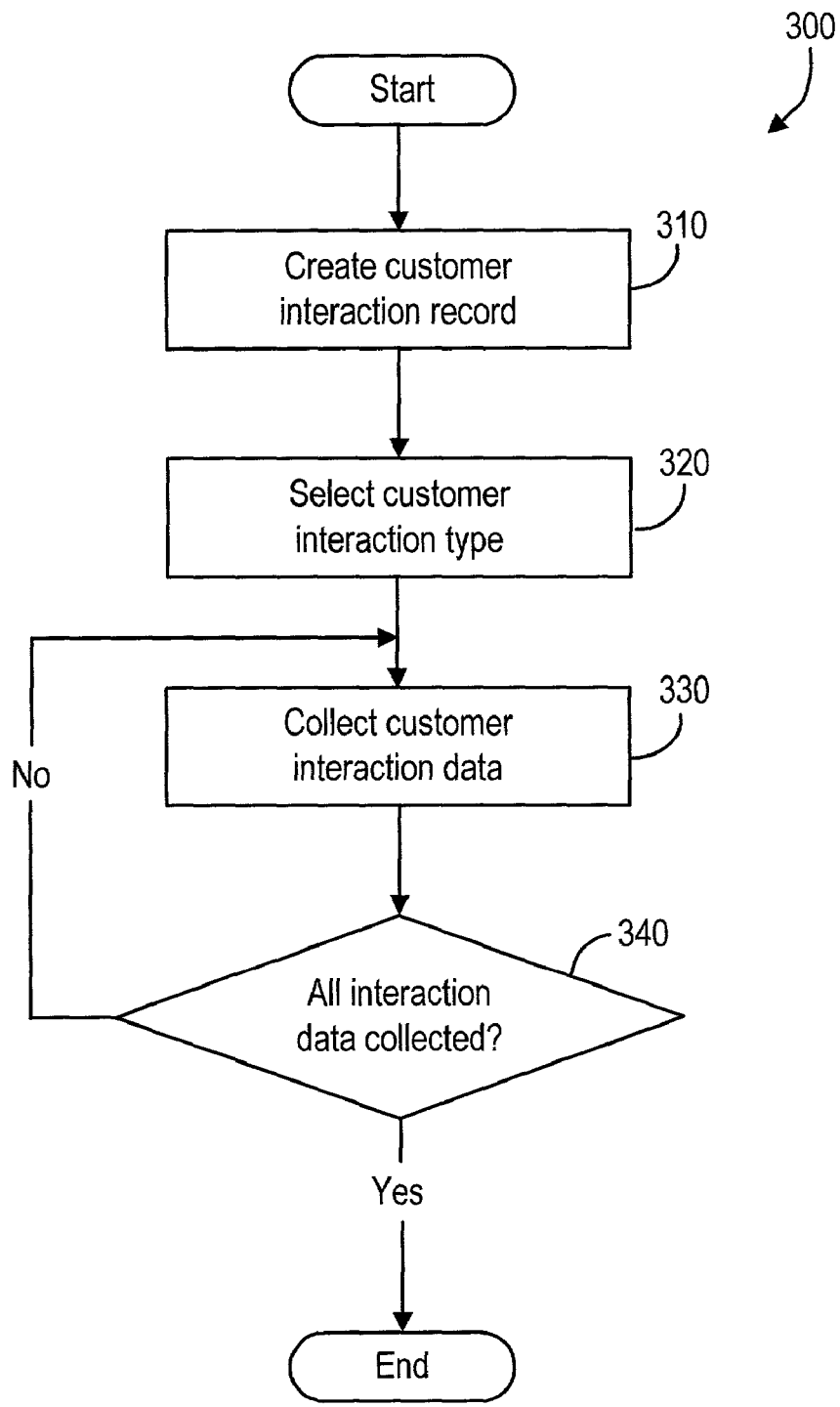
FIG. 3 is a flow diagram of an operation for documenting a customer interaction, in accordance with some embodiments of the invention.

FIG. 3 is a flow diagram of an operation 300 for documenting a customer interaction. First, in stage 310 a customer interaction record is created. Then, in stage 320, a user selects a type of the customer interaction. Based on the type of customer interaction selected in stage 320, data necessary to document the specific type of customer interaction selected by the user is collected in stage 330. Stage 340 then determines if all of the necessary data has been collected, in which case operation 300 terminates. Otherwise, stages 330 and 340 are repeated until all of the information necessary to document the customer interaction has been collected and added to the customer interaction record. The customer interaction record is then stored in database 270.

Figure 4:
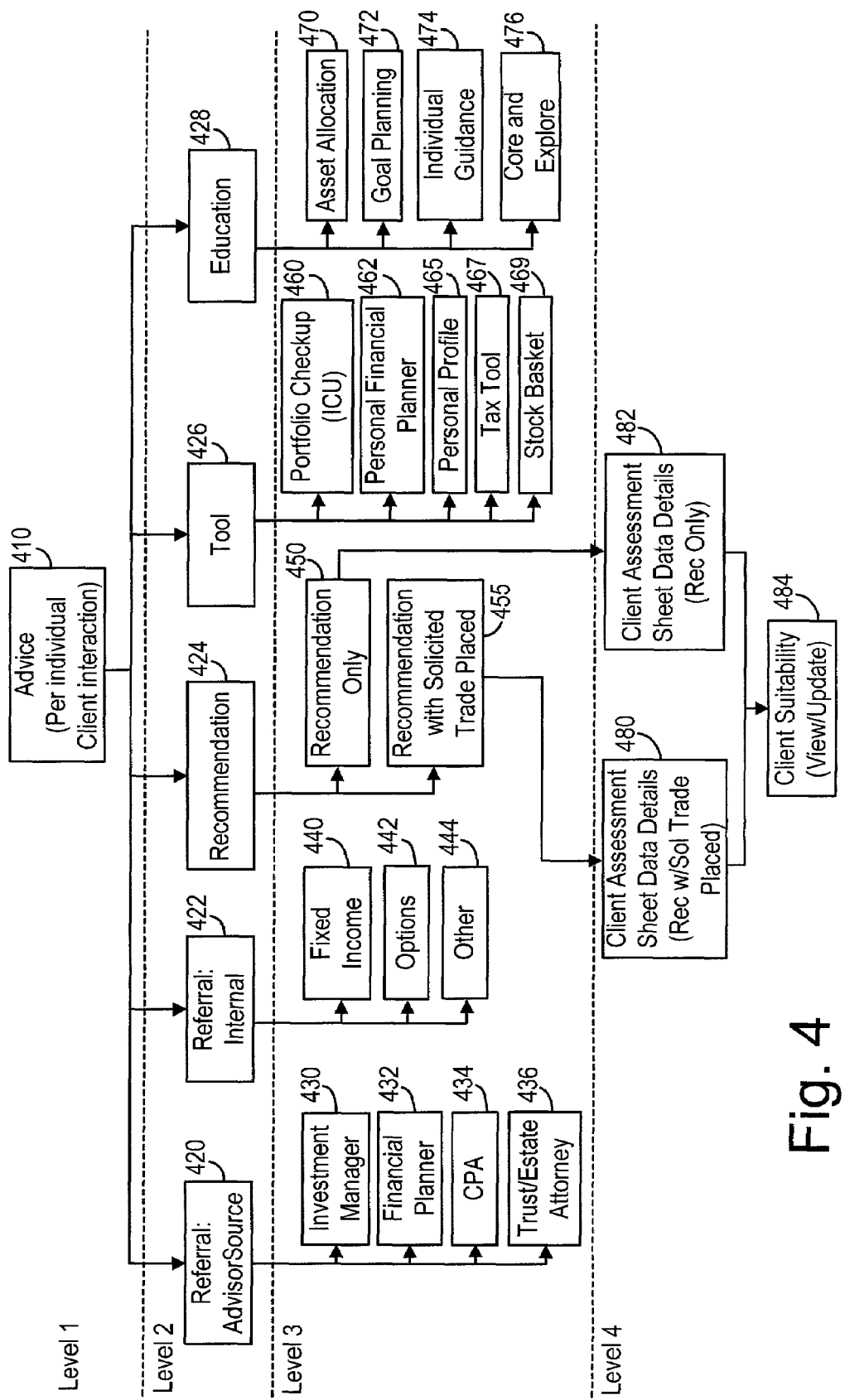
FIG. 4 illustrates a hierarchical representation of the types of customer interaction records supported by the computer system 100 of FIG. 1.

FIG. 4 illustrates a hierarchical representation of the types of customer interaction records supported by computer system 100, in accordance to an embodiment of the invention. As shown in FIG. 4, interaction records can be classified at four levels. At level 1, an interaction record 410 is created for each individual client interaction. At level 2, each interaction record is viewed as having a specific type: Referral:AdvisorSource 420, Referral:Internal 422, Recommendation 424, Tool 426 or Education 428. At level 3, detailed information is stored depending on the specific type of advice interaction 410. In particular, a Referral:AdvisorSource interaction 420 is classified as either Investment Manger 430, Financial Planner 432, CPA 434 or US Trust 436. Similarly, a Referral:Internal interaction 420 is classified as either Fixed Income 440, Options 442 or Other 444. A Recommendation interaction 424, in turn can be either a Recommendation Only interaction 450 or a Recommendation With Trade Placed 455. A Tool interaction can be classified as Portfolio Checkup 460, Personal Financial Planner 462, Personal Profiler 465, Tax Tool 467 or Stock Basket 469. Finally, an Education interaction 428 can be classified as Asset Allocation 470, Goal Planning 472, Individual Guidance 474 or Core and Explore 476. At level 4, a client assesment sheet 480 or 482 is provided to complete the advice interaction record. It should be noted that only recommendation interactions 424 have a level 4 classification, which depends in turn on whether the Recommendation interaction is a Recommendation only 450 (CAS 480)or a Recommendation with Solicited Trade Placed 455 (CAS 482). Once completed, the CAS 480 or 482 is viewed as client suitability 484.

Figure 5:
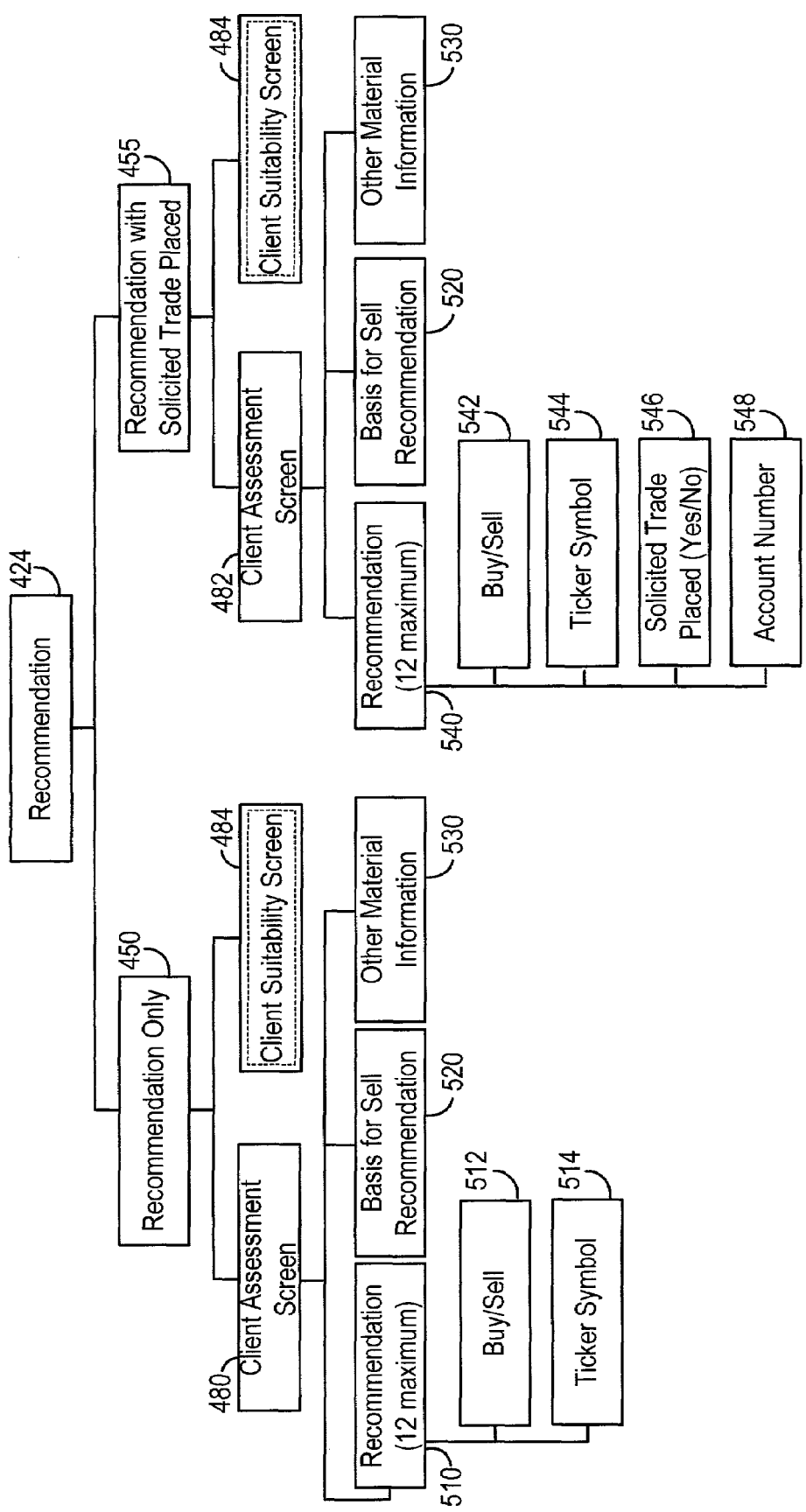
FIG. 5 shows a hierarchical view of the information captured for Recommendation interaction records, in accordance with some embodiments of the invention.

FIG. 5 shows a hierarchical view of the information captured for Recommendation interaction records 424. As shown in FIG. 5, Recommendation interaction 424 is either a Recommendation Only interaction 450 or a Recommendation With Solicited Trade Placed 455. Recommendation Only interaction 450, in turn, requires the user to complete a Client Assessment Screen 480 and a Client Suitability Screen 484. Similarly, Recommendation With Solicited Trade Placed 455 requires the user to complete a Client Assessment Screen 482 and Client Suitability Screen 484. Client Assessment Screen 480, in turn, includes up to 12 Recommendation entries 510, a Basis for Sell Recommendation entry 520 and an Other Material Information entry 530. Similarly, Client Assessment Screen 482 includes up to 12 Recommendation entries 540, a Basis for Sell Recommendation entry 520 and an Other Material Information entry 530.

Recommendation entries 510, in turn, include a Buy/Sell field 512 and a Ticker Symbol field 514. Recommendation entries 540, on the other end, contain a Buy/Sell field 542, a Ticker Symbol field 544, a Solicited Trade Placed filed 546 and an Account Number field 548.

Figure 6:
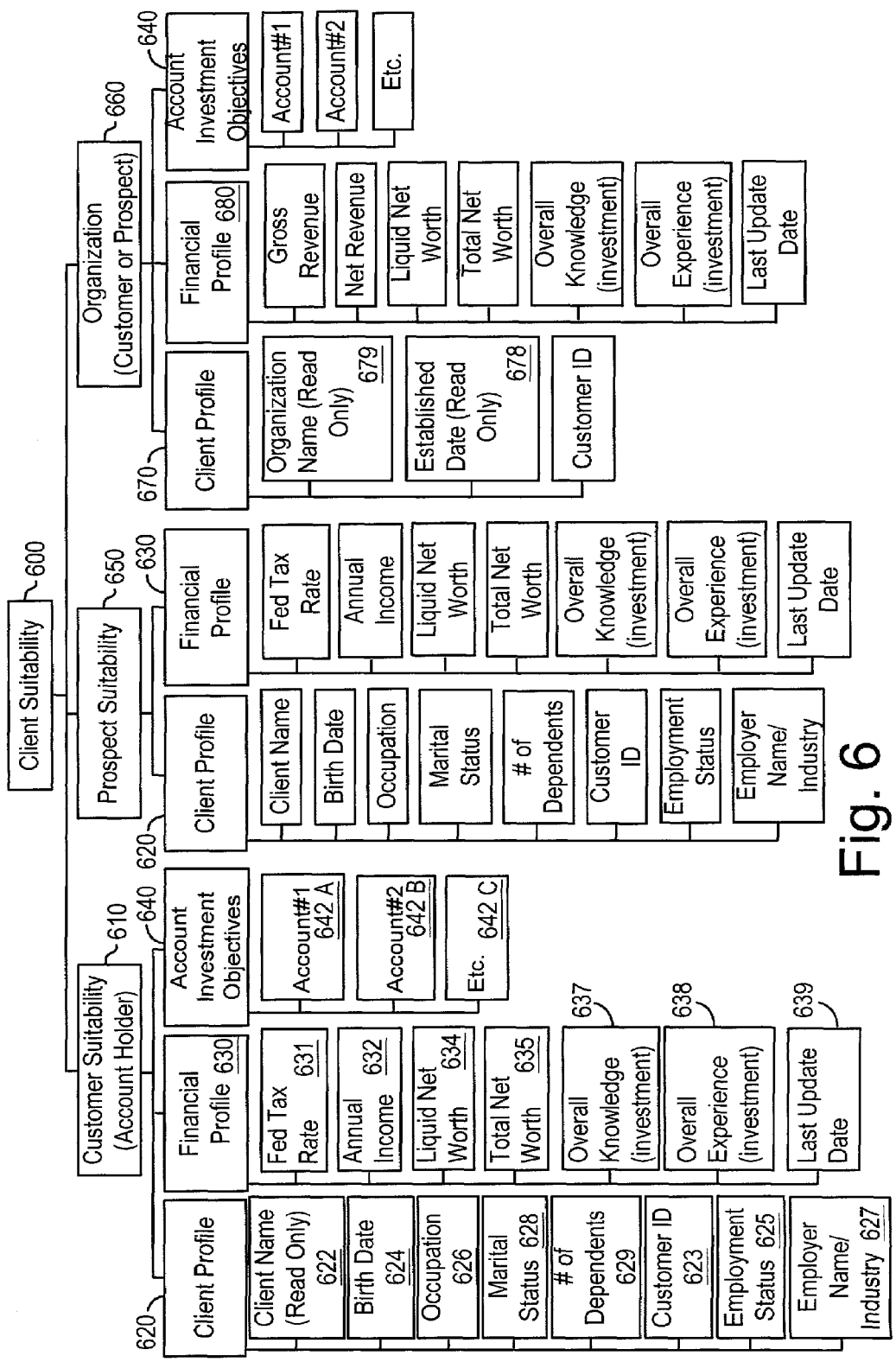
FIG. 6 is a block diagram of the hierarchical organization of client suitability information collected by the Client Suitability Screen of FIGS. 4 and 5.

FIG. 6 is a block diagram of the hierarchical organization of client suitability information collected by Client Suitability Screen 484 (FIGS. 4 and 5). Client suitability data 600 falls into one of three separate categories, Account Holder Client Suitability 610, Prospect Suitability 650 or Organization Suitability ("Non-natural Person") 660, depending on the relationship of the broker with the client (e.g., account holder, prospect or organization). Account Holder Client Suitability 610 includes a Client Profile 620, a Financial Profile 630 and Account Investment Objectives 640. Prospect Suitability 650, in turn, includes Client Profile 620 and Financial Profile 630. Organization Suitability ("Non-natural Person") 660 includes Client Profile 620, Financial Profile 680 and Account Investment Objectives 640.

Client Profile 620 includes client name field 622, birth date field 624, occupation field 626, marital status field 628, dependents field 629, customer ID filed 623, employment status field 625 and employer name/industry field 627. Financial Profile 630 includes a federal tax rate field 631, an annual income field 632, a liquid net worth field 634, a total net worth field 635, an overall investment knowledge field 637, an overall experience field 638 and a last update field 639. Account Investment Objectives 640, in turn, include multiple account fields 642n (where n=A, B, C . . . ). Client Profile 670 includes an organization name field 674, an established date field 678 and a customer ID field 672.

Figure 7:
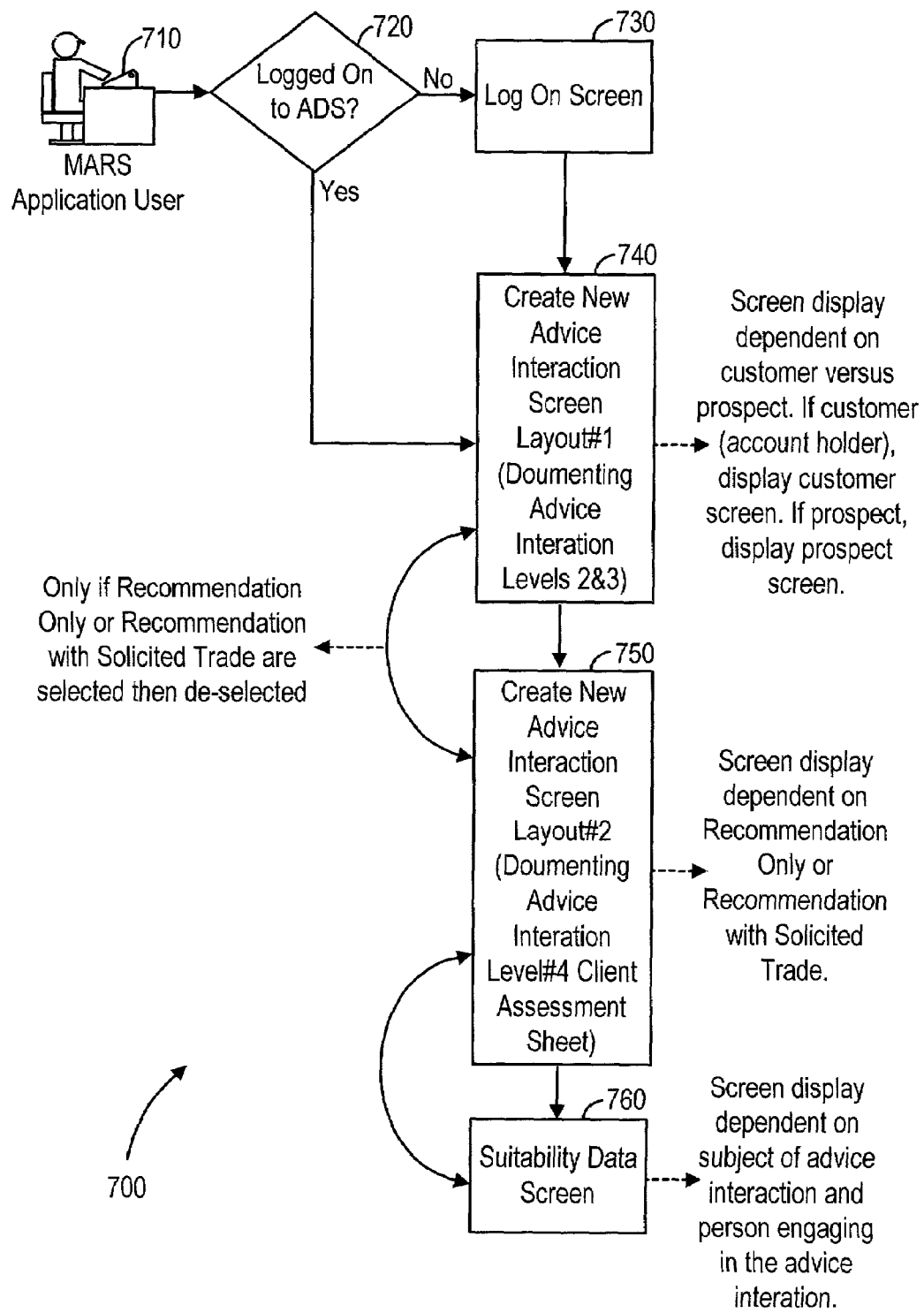
FIG. 7 is a flow diagram of an interaction data entering operation, in accordance to some embodiments of the invention.
Figure 9A:
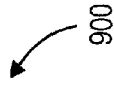

FIG. 7 is a flow diagram of an interaction data entering operation 700, in accordance to some embodiments of the invention. First, stage 720 determines whether a MARS user 710 is logged on to an automated documentation system (ADS), in accordance to an embodiment of the present invention, in which case operation 700 proceeds to stage 740. Otherwise, operation 700 proceeds to stage 730 in which a log on screen is presented to the user. Upon entering valid user information, a first new advice interaction screen is composed and presented to the user in stage 740. The first new advice interaction screen contains different information depending on whether the client is a customer (FIG. 9A) or a prospect (FIG. 12A). In stage 750, a second new advice interaction screen is presented to the user. The second new advice interaction screen is designed to collect Level #4 information for CAS 480 or 482 (FIG. 4) and contains different information depending on whether the advice interaction being documented is a Recommendation Only 450 (FIG. 9B or 12B) or a Recommendation with Solicited Trade 455 (FIG. 9C).

Finally, a client suitability screen (FIGS. 10A-10D and 13) is presented to the user in stage 760. The contents of the client suitability screen are dependent on the subject of the advice interaction and the broker representative engaged in the advice interaction.

FIGS. 8A and 8B are a flow diagram of the operation 800 of an advice interaction system, in accordance to some embodiments of the present invention, for a customer.

First, customer advice interaction screen 900 (FIG. 9A) is presented to the user (stage 802). The user begins documenting the advice interaction by entering information of customer advice interaction screen 900 (stage 804). Stage 806 then determines whether the advice interaction is a Recommendation only interaction, in which case operation 800 proceeds to stage 808. Otherwise, operation 800 proceeds to stage 812. In stage 808, the user selects a recommendation only interaction, causing customer advice interaction screen 900 (FIGS. 9B1 and 9B2) to be displayed. Customer advice interaction screen 900 includes a field indicating the name of the client representative for the advice interaction. In some embodiments, the client representative field is a list of all persons having trade authorization for any account held by the client. Alternatively, stage 812 determines whether the advice interaction is a Recommendation with Solicited Trade, in which case operation 800 proceeds to stage 814. Otherwise, operation 800 proceeds to stage 818. In stage 814, customer advice interaction screen 900 (FIGS. 9C1 and 9C2) is presented again to the user. In stage 818, customer advice interaction screen 900 is again presented to the user for editing. Using customer advice interaction screen 900, the user can elect to save the advice interaction information (stage 820), close advice interaction screen 900 (stage 834), cancel the advice interaction (stage 850) or present client suitability screen 1000 (FIGS. 10A-10D) to the user (stage 864).

If the user elects to save the advice interaction data, stage 822 determines whether the information entered by the user meets a set of predefined data validation criteria, in which case operation 800 proceeds to stage 826. Otherwise, operation 800 proceeds to stage 824, where a data validation message is displayed to the user. In stage 826, a message is displayed to the user to ask confirmation to save the entered data. Stage 828 then determines whether to continue with the save operation, in which case operation 800 proceeds to stage 830. Otherwise, operation 800 proceeds to stage 818. The data entered by the user and validated by the system is then saved (stage 830) and customer advice interaction screen 900 is redisplayed in read-only mode (stage 832).

If the user elects to close customer advice interaction screen 900, stage 836 determines whether advice interaction data entered on customer advice interaction screen 900 has been saved, in which case operation 800 proceeds to stage 838 where customer advice interaction screen 900 is closed. Otherwise, operation 800 proceeds to stage 840. A message asking the user whether to save entered information and close the screen is displayed to the user (stage 840) and stage 842 determines whether the user has elected to continue with the save operation, in which case operation 800 proceeds to stage 844. Otherwise, operation 800 proceeds to stage 818. Stage 844, in turn, determines whether the data entered by the user meets validation criteria, in which case operation 800 proceeds to stage 846, where the data is saved. The data saved by the user is used to update an authoritative database of client and advice interaction history information. This database is, in turn, used to document compliance with trading regulations. Otherwise, a message is displayed to alert the user that data validation has failed (stage 848) and operation 800 proceeds to stage 818.

If the user elects to cancel the advice interaction, stage 852 determines whether advice interaction data was entered and not saved, in which case operation 800 proceeds to stage 854. Otherwise, operation 800 proceeds to stage 838. In stage 854, a message is displayed to alert the user that data has been entered and not saved. Stage 856 then determines whether the user has elected to save any changes, in which case operation 800 proceeds to stage 859. Otherwise, operation 800 proceeds to stage 838. Stage 858 then determines whether the data entered by the user meets validation criteria, in which case operation 800 proceeds to stage 860, where the data is saved. Otherwise, a message is displayed to notify the user that data validation has failed (stage 862) and operation 800 proceeds to stage 818.

If the user has elected to enter/update client suitability data, stage 866 (FIG. 8B) determines whether the advice interaction data has been saved, in which case operation 800 proceeds to stage 868. Otherwise, operation 800 proceeds to stage 872. In stage 868, client suitability screen 1000 (FIGS. 10A-10D) is presented to the user in read-only mode. The user, in turn, selects the advice interaction mode (stage 870) and operation 800 proceeds to stage 818. In stage 872, client suitability screen 1000 is presented to the user in edit mode. The user, in turn, edits the client suitability data entered on client suitability screen 1000 (stage 874). FIGS. 10A-10D illustrate possible layouts for client suitability screen 1000 depending on the subject of the advice interaction and the person engaging in the advice interaction. The user then elects to return to the advice interaction mode (stage 876), save the suitability data (stage 890) or cancel the suitability data entry (stage 805).

If the user selects the advice interaction mode, stage 878 determines whether any suitability data has been entered by the user on client suitability screen 1000, in which case operation 800 proceeds to stage 880. Otherwise, operation 800 proceeds to stage 818 (FIG. 8A). In stage 880, a message is displayed to alert the user that suitability data has been entered but not saved. Stage 882 then determines whether the user has elected to continue with the save operation, in which case operation 800 proceeds to stage 884. Otherwise, operation 800 proceeds to stage 818 (FIG. 8A). Stage 884 then determines whether the suitability data entered by the user meets data validation criteria, in which case the suitability data is saved (stage 886). Otherwise, a message is displayed to alert the user that a data validation error has occurred (stage 888) and operation 800 proceeds to stage 874.

If the user selects save suitability data, stage 890 determines whether the suitability data has been edited by the user on client suitability screen 1000, in which case operation 800 proceeds to stage 898. Otherwise, operation 800 proceeds to stage 894. In stage 894, a message is displayed to alert the user that suitability data has been edited but not saved. Stage 896 then determines whether the user has elected to continue with the save operation, in which case operation 800 proceeds to stage 898. Otherwise, operation 800 proceeds to stage 874. Stage 898 then determines whether the suitability data entered by the user meets data validation criteria, in which case the suitability data is saved (stage 801). Otherwise, a message is displayed to alert the user that a data validation error has occurred (stage 803) and operation 800 proceeds to stage 874.

If the user elects to cancel the suitability data operation, stage 807 determines if the suitability data on client suitability screen 1000 has been edited, in which case operation 800 proceeds to stage 809. Otherwise, operation 800 proceeds to stage 818 (FIG. 8A). In stage 809, a message is displayed to alert the user that the suitability data has been edited but not saved. Stage 811 then determines whether the user has elected to save or cancel the changes to the suitability data. If the user has elected to save the changes, operation 800 proceeds to stage 813. Otherwise, operation 800 proceeds to stage 818 (FIG. 8A). Stage 813, in turn, determines whether the suitability data entered by the user meets data validation criteria, in which case the data is saved (stage 815). Otherwise, a message is displayed to alert the user that a data validation error has occurred (stage 817) and operation 800 proceeds to stage 874.

FIGS. 11A and 11B are a flow diagram of the operation 1100 of an advice interaction system, in accordance to some embodiments of the present invention, for a prospect.

First, prospect advice interaction screen 1200 (FIG. 12A) is presented to the user (stage 1102). The user begins documenting the advice interaction by entering information on prospect advice interaction screen 1200 (stage 1104). Stage 1106 then determines whether the advice interaction is a Recommendation only interaction, in which case operation 1100 proceeds to stage 1108. Otherwise, operation 1100 proceeds to stage 1112. In stage 1108, the user selects a recommendation only interaction, causing prospect advice interaction screen 1200 (FIGS. 12B1 and 12B2) to be displayed. In stage 1112, prospect advice interaction screen 1200 is again presented to the user for editing. Using prospect advice interaction screen 1200, the user can elect to save the advice interaction information (stage 1124), close prospect advice interaction screen 1200 (stage 1128), cancel the advice interaction (stage 1144) or present prospect suitability screen 1300 (FIG. 13) to the user (stage 1158).

If the user elects to save the advice interaction data, stage 1116 determines whether the information entered by the user meets a set of predefined data validation criteria, in which case operation 1100 proceeds to stage 1120. Otherwise, operation 1100 proceeds to stage 1118, where a data validation message is displayed to the user. In stage 1120, a message is displayed to the user to ask confirmation to save the entered data. Stage 1122 then determines whether to continue with the save operation, in which case operation 1100 proceeds to stage 1124. Otherwise, operation 1100 proceeds to stage 1112. The data entered by the user and validated by the system is then saved (stage 1124) and prospect advice interaction screen 1200 is redisplayed in read-only mode (stage 1126).

If the user elects to close prospect advice interaction screen 1200, stage 1130 determines whether advice interaction data entered on prospect advice interaction screen 1200 has been saved, in which case operation 1100 proceeds to stage 1142 where prospect advice interaction screen 1200 is closed. Otherwise, operation 1100 proceeds to stage 1132. A message asking the user whether to save entered information and close the screen is displayed to the user (stage 1132) and stage 1134 determines whether the user has elected to continue with the save operation, in which case operation 1100 proceeds to stage 1136. Otherwise, operation 1100 proceeds to stage 1138. Stage 1136, in turn, determines whether the data entered by the user meets validation criteria, in which case operation 1100 proceeds to stage 1140, where the data is saved. Otherwise, a message is displayed to alert the user that data validation has failed and operation 1100 proceeds to stage 1112.

If the user elects to cancel the advice interaction, stage 1146 determines whether advice interaction data was entered and not saved, in which case operation 1100 proceeds to stage 1148. Otherwise, operation 1100 proceeds to stage 1142. In stage 1148, a message is displayed to alert the user that data has been entered and not saved. Stage 1150 then determines whether the user has elected to save any changes, in which case operation 1100 proceeds to stage 1152. Otherwise, operation 1100 proceeds to stage 1142. Stage 1152 then determines whether the data entered by the user meets validation criteria, in which case operation 1100 proceeds to stage 1154, where the data is saved. Otherwise, operation 1100 proceeds to stage 1156, where a message is displayed to notify the user that data validation has failed.

If the user has elected to enter prospect suitability data, stage 1160 (FIG. 11B) determines whether the advice interaction data has been saved, in which case operation 1100 proceeds to stage 1162. Otherwise, operation 1100 proceeds to stage 1166. In stage 1162, prospect suitability screen 1300 (FIG. 13) is presented to the user in read-only mode. The user, in turn, selects the advice interaction mode (stage 1164) and operation 1100 proceeds to stage 1126 (FIG. 11A). In stage 1166, prospect suitability screen 1300 is presented to the user in edit mode. The user, in turn, edits the prospect suitability data entered on prospect suitability screen 1300 (stage 1168). The user then elects to return to the advice interaction mode (stage 1170), save the suitability data (stage 1184) or cancel the suitability data entry (stage 1198).

If the user selects the advice interaction mode, stage 1172 determines whether any suitability data has been entered by the user on prospect suitability screen 1300, in which case operation 1100 proceeds to stage 1174. Otherwise, operation 1100 proceeds to stage 1112 (FIG. 11A). In stage 1174, a message is displayed to alert the user that suitability data has been entered but not saved. Stage 1176 then determines whether the user has elected to continue with the save operation, in which case operation 1100 proceeds to stage 1178. Otherwise, operation 1100 proceeds to stage 1112 (FIG. 8A). Stage 1178 then determines whether the suitability data entered by the user meets data validation criteria, in which case the suitability data is saved (stage 1180). Otherwise, a message is displayed to alert the user that a data validation error has occurred (stage 1182) and operation 1100 proceeds to stage 1168.

If the user elects to save suitability data, stage 1186 determines whether the suitability data has been edited by the user on prospect suitability screen 1300, in which case operation 1100 proceeds to stage 1192. Otherwise, operation 1100 proceeds to stage 1188. In stage 1188, a message is displayed to alert the user that suitability data has been edited but not saved. Stage 1190 then determines whether the user has elected to continue with the save operation, in which case operation 1100 proceeds to stage 1192. Otherwise, operation 1100 proceeds to stage 1168. Stage 1192 then determines whether the suitability data entered by the user meets data validation criteria, in which case the suitability data is saved (stage 1194). Otherwise, a message is displayed to alert the user that a data validation error has occurred (stage 1196) and operation 1100 proceeds to stage 1168.

If the user elects to cancel the suitability data operation, stage 1101 determines if the suitability data on prospect suitability screen 1300 has been edited, in which case operation 1100 proceeds to stage 1103. Otherwise, operation 1100 proceeds to stage 1112 (FIG. 11A). In stage 1103, a message is displayed to alert the user that the suitability data has been edited but not saved. Stage 1105 then determines whether the user has elected to save or cancel the changes to the suitability data. If the user has elected to save the changes, operation 1100 proceeds to stage 1107. Otherwise, operation 1100 proceeds to stage 1112 (FIG. 11A). Stage 1107, in turn, determines whether the suitability data entered by the user meets data validation criteria, in which case the data is saved (stage 1109). Otherwise, a message is displayed to alert the user that a data validation error has occurred (stage 1111) and operation 1100 proceeds to stage 1168.

Figure 14A:
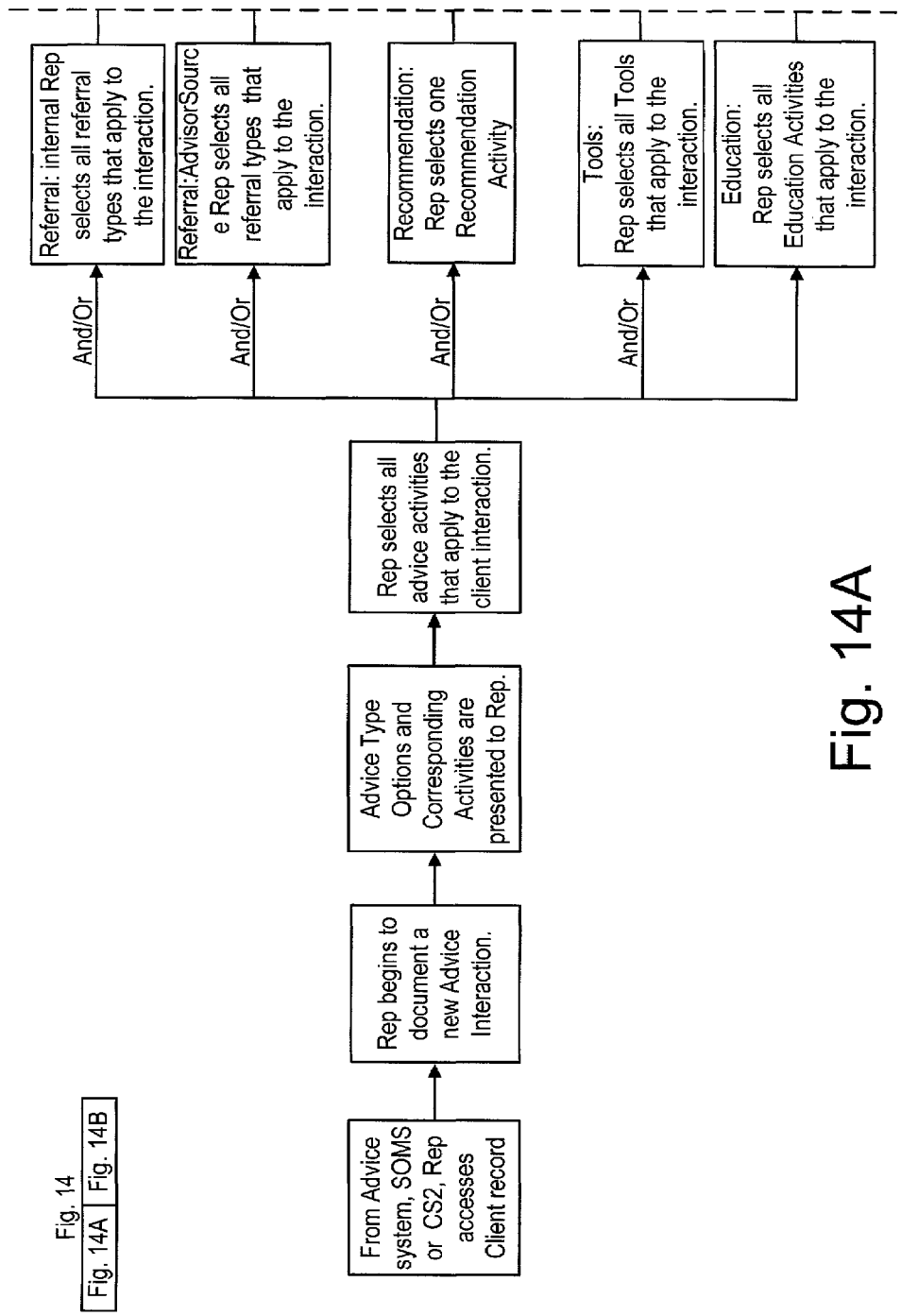
FIG. 14 is a user-level flow diagram of an advice interaction documentation operation, in accordance with some embodiments of the invention.
Figure 14B:
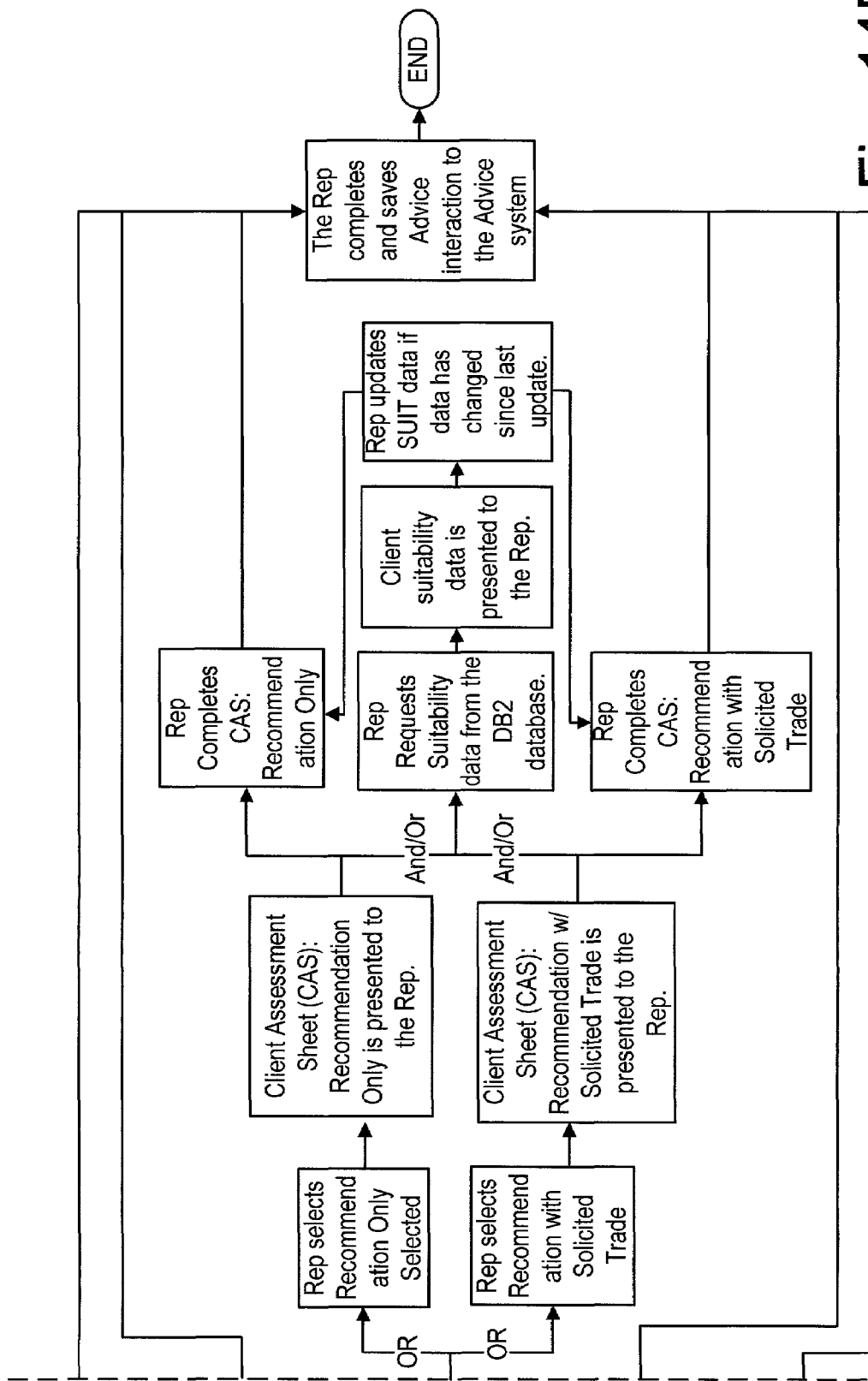

FIG. 14 is a user-level flow diagram of an advice interaction documentation operation, in accordance with some embodiments of the invention. First, a customer service representative accesses a client record stored on the advice interaction documentation system (stage 1402). The representative then begins to document a new advice interaction (stage 1404) with the client whose record has been retrieved in stage 1402. Advice type options and corresponding activities are presented to the representative (stage 1406) and the representative, in turn, selects all advice activities that apply to the client interaction being documented (stage 1408). Depending on the type of advice interaction being documented, operation 1400 may proceed to any combination of stages 1410, 1415, 1420, 1442 and 1444 depending on the type of client interaction being documented.

If the advice interaction is a Referral:
AdvisorSource, the representative selects all referral types that apply to the interaction from an advice interaction screen (stage 1410) and operation 1400 proceeds to stage 1428.

If the advice interaction is a Referral: Internal, the representative selects all referral types that apply to the interaction from an advice interaction screen (stage 1415) and operation 1400 proceeds to stage 1428.

If the advice interaction is a Recommendation, the representative selects a single recommendation activity (stage 1420) and operation 1400 proceeds to stages 1422 or 1438, depending on whether the recommendation is a Recommendation Only or a Recommendation with Solicited Trade, respectively. In stage 1422, the representative selects the Recommendation Only option. A client assessment sheet (CAS) for a Recommendation Only interaction is presented to the representative (stage 1424), the representative completes the CAS (stage 1426) and operation 1400 proceeds to stage 1428. Alternatively, the representative may choose to retrieve suitability data stored in a customer database (stage 1430), in which case the suitability data is presented to the representative (stage 1432). The representative then updates the suitability data (stage 1434), if necessary, and operation 1400 proceeds to stage 1426. In stage 1438, the representative selects the Recommendation with Solicited Trade option. A CAS for Recommendation with Solicited Trade is then presented to the representative (stage 1440), the representative completes the CAS (stage 1436) and operation 1400 proceeds to stage 1428. Alternatively, the representative may choose to retrieve the client suitability data from a customer database as described above with respect to stages 1430-1434, after which operation 1400 proceeds to stage 1436.

The representative may also select one or more tools (stage 1442) provided by advice interaction documentation system. Once the representative is done using the tools, operation 1400 proceeds to stage 1428. If the advice interaction is an Education, the representative selects all education activities (stage 1444) and operation 1400 proceeds to stage 1428. Finally, in stage 1428, the representative completes and save the advice interaction data and operation 1400 terminates.

Figure 15B:
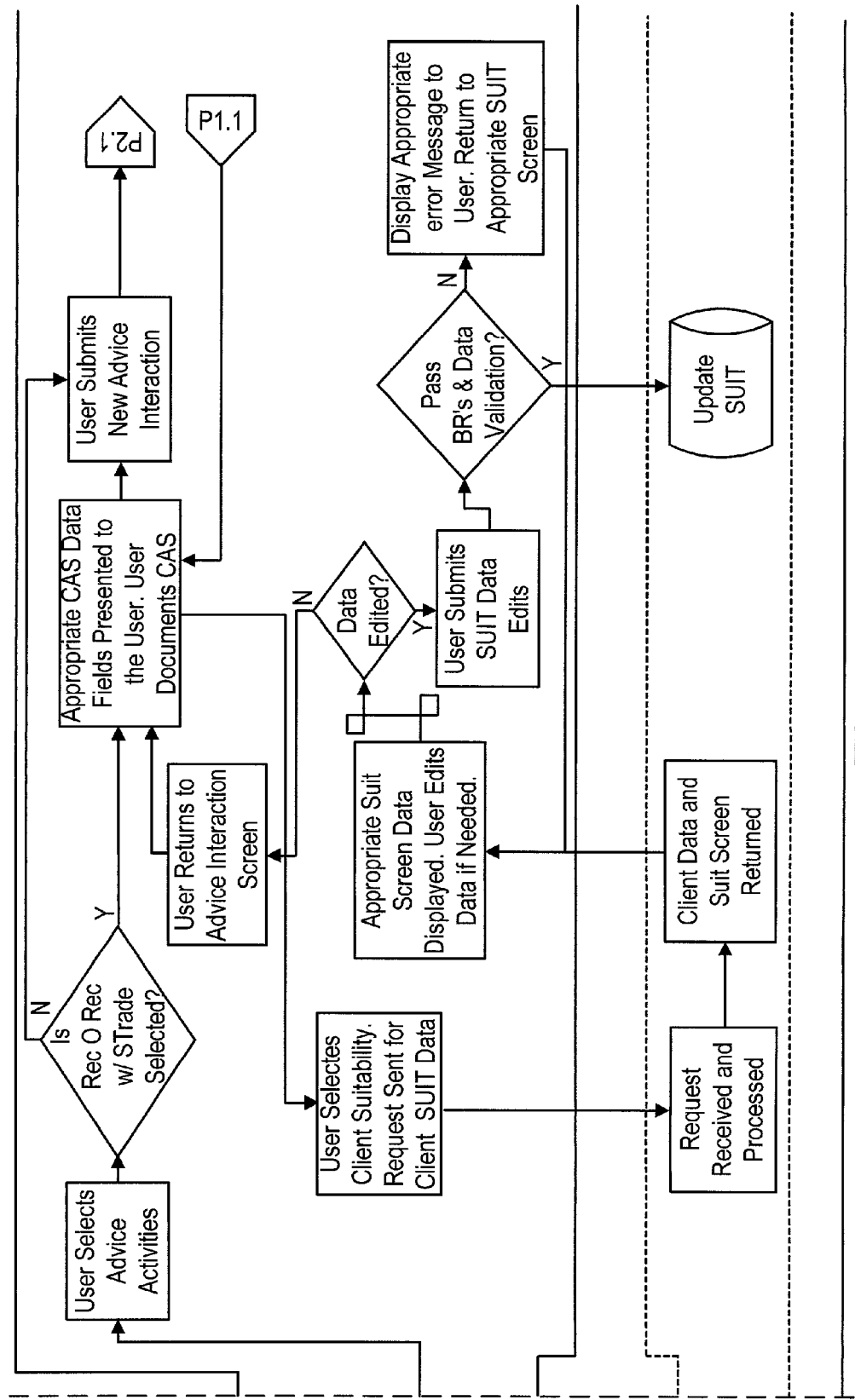
FIG. 15 is a system-level flow diagram of an advice interaction documentation operation, in accordance with some embodiments of the invention.

FIG. 15 is a system-level flow diagram of an advice interaction documentation operation 1500, in accordance with some embodiments of the invention. First, in stage 1502, a user of a desktop terminal/computer accesses the advice interaction documentation system through a link provided on MARS (??) application program. Client and user parameters are then entered by the user using MARS and transmitted to the advice interaction documentation system (stage 1504). The advice system application program is launched (stage 1506) and stage 1508 determines if the user is logged on to the advice system, in which case operation 1500 proceeds to stage 1514. Otherwise, operation 1500 proceeds to stage 1510. In stage 1510, an logon screen is presented to the user and the user enters logon information. Stage 1512 then determines whether the logon information entered by the user is valid, in which case operation 1500 proceeds to stage 1514. Otherwise, operation 1500 proceeds to stage 1516, where an access denied message is displayed. Stage 1518 then determines if the user wants to attempt logging on again, in which case operation 1500 proceeds to stage 1510. Otherwise, the advice system application program is closed (stage 1520) and operation 1500 terminates. In stage 1514, a request to retrieve the client data and create new advice activity data is sent from the advice system application program executed on the user's desktop computer to the advice system server program executed on a remote computer. The advice system server program receives and processes the request (stage 1522) and returns the client data and a new advice interaction screen to the advice system application program (stage 1524). An advice documentation screen is presented to the user who, in turn, begins documenting the advice interaction (stage 1526). The user then selects advice activities (stage 1528) and stage 1530 determines whether the selected advice activity is a Recommendation with Solicited Trade, in which case operation 1500 proceeds to stage 1532. Otherwise, operation 1500 proceeds to stage 1534. In stage 1532, the user is presented with a CAS screen populated with data fields corresponding to the type of advice interaction being documented. Next, if the user selects client suitability data, a request is sent to a suitability database to retrieve the client suitability data (stage 1538). A server storing the client suitability database receives and processes the request (stage 1540) and returns the client suitability data together with a suitability screen to the advice system application program (stage 1542). A client suitability screen is then presented to the user for editing (stage 1544). Stage 1546 then determines whether the user has edited the client suitability data, in which case operation 1500 proceeds to stage 1548. Otherwise, operation 1500 proceeds to stage 1536, where the advice documentation screen is again presented to the user. In stage 1548 the user submits edits to the client suitability data and stage 1550 determines whether the user edited client suitability data satisfies data validation criteria, in which case operation 1500 proceeds to stage 1554, where the client suitability database is updated. Otherwise, operation 1500 proceeds to stage 1552. In stage 1552, a message is displayed to alert the user that the data validation operation has failed and operation 1500 proceeds to stage 1544.

Figure 16A:
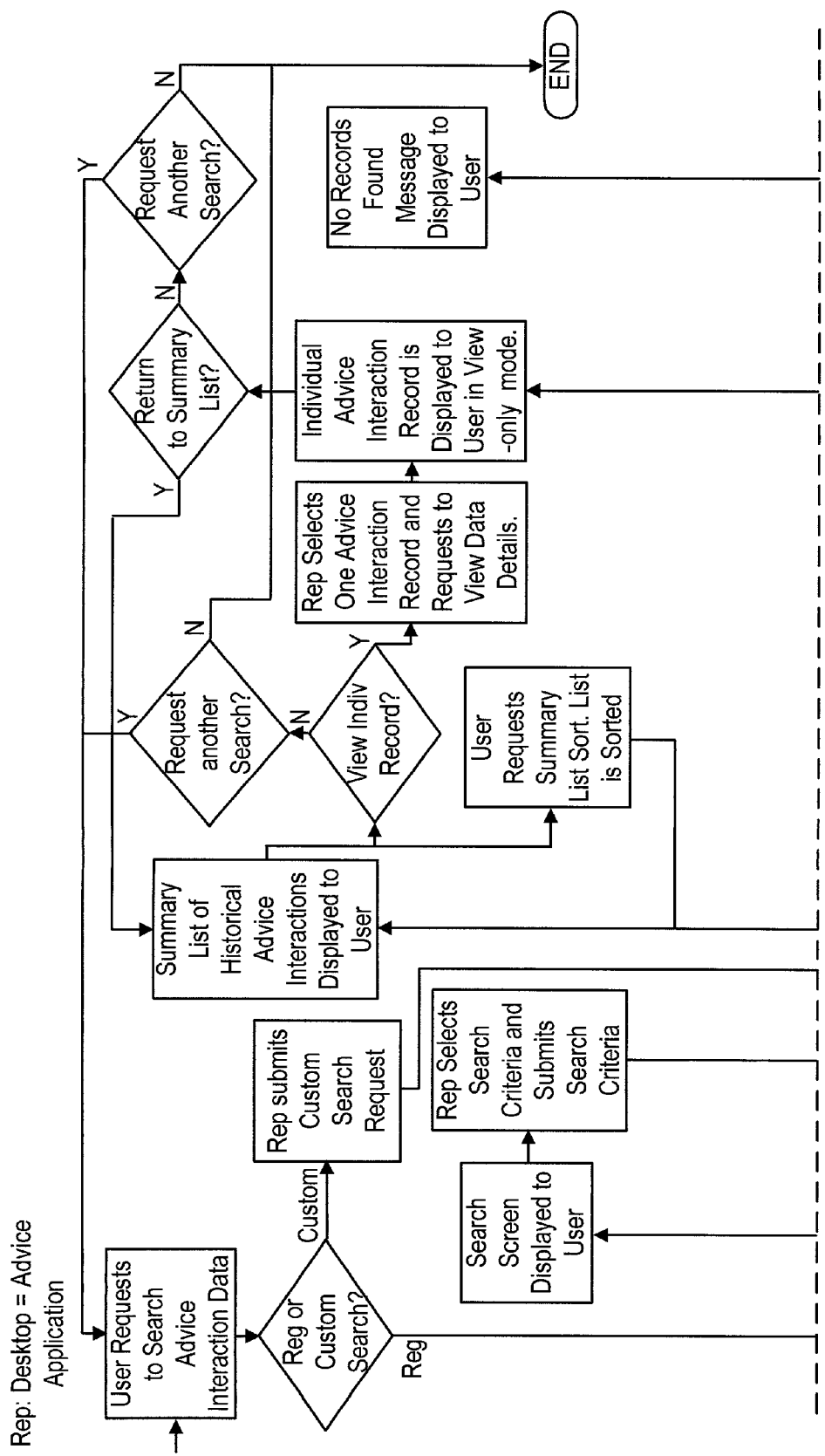
FIG. 16 is a flow diagram of a search and retrieval of advice interaction data operation, in accordance to some embodiments of the invention.
Figure 16B:
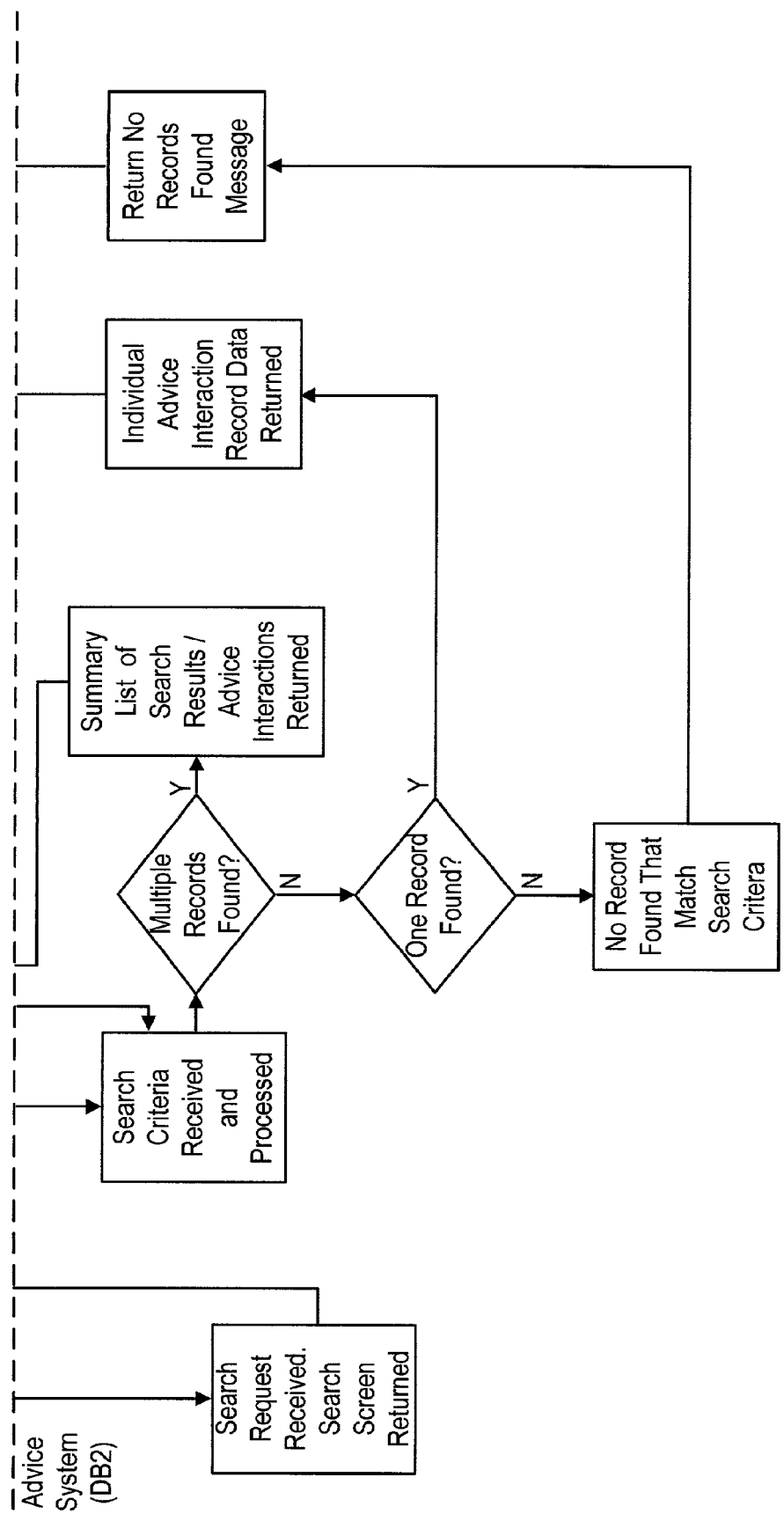

Once data is stored in the advice interaction system, advice interaction data can be later accessed to monitor compliance with securities regulations. FIG. 16 is a flow diagram of a search and retrieval of advice interaction data operation 1600, in accordance to some embodiments of the invention.

First, in stage 1602, the user initiates a search of the advice interaction database. Stage 1604 then determines whether the user is requesting a regular or a customized search. If the user selects a regular search, the request is forwarded to the server storing the advice interaction database and the server returns a search screen to the user's computer (stage 1640). A search screen is displayed to the user for editing (stage 1642), the representative enters the appropriate search parameters (stage 1644) and the search criteria are sent to the database server (stage 1608). If the user selects a custom search, the search criteria specified by the user are sent directly to the database server (stage 1606) and operation 1600 proceeds to stage 1608. Stage 1610 then determines whether more than one record satisfies the search criteria, in which case operation 1600 proceeds to stage 1612. Otherwise, operation 1600 proceeds to stage 1630. In stage 1612, a list of results is generated by the database server and sent to the user's computer. A summary list of advice interaction data is thus displayed to the user (stage 1614). Stage 1616 then determines whether the user has elected to display an individual record, in which case a single record is selected (stage 1618) and the details of the advice interaction record are shown to the user (stage 1620). Otherwise, operation 1600 proceeds to stage 1626. Stage 1626, in turn, determines whether the user has requested another search, in which case operation 1600 proceeds to stage 1602. Otherwise, operation 1600 terminates.

Stage 1630, in turn, determines whether only one record meets the search criteria, in which case operation 1600 proceeds to stage 1632. Otherwise, operation 1600 proceeds to stage 1634. In stage 1632, the record is sent to the user's computer and operation 1600 proceeds to stage 1620. If stage 1634 is reached, no records have been found in the database that satisfy the search criteria and operation 1600 proceeds to stage 1636. In stage 1636, a no records found message is sent to the user's computer and a message is displayed to the user to alert the user that no records have been found (stage 1638). Stage 1624 then determines whether the user has elected to perform another search, in which case operation 1600 proceeds to stage 1602. Otherwise, operation 1600 terminates. Finally, stage 1622 determines whether the user has elected to return to the summary list, in which case operation 1600 returns to stage 1614. Otherwise, operation 1600 terminates.

Embodiments described above illustrate but do not limit the invention. As a result, the present invention is not limited to any specific order of the operations described in the flow diagrams. Numerous modifications and variations are possible in accordance to the principles of the present invention, as described by the following claims.

We claim:

1. A computer system for tracking regulatory governed communications between a securities broker and one or more clients, comprising:
    a broker side server and communications interface for communicating with a data repository database and one or more client computers, the broker side server programmed with a set of instructions comprising
        generating a client side interface, the client side interface including a plurality of unique customer request categories,
        receiving one or more selections from the plurality of customer request categories,
        determining data necessary to document the communications between the broker side server and the one or more client computers,
        retrieving the data necessary to document the communications between the broker side server and the one or more client computers,
        verifying if the retrieved data substantially complies with required information, and
        repeating the retrieving step until the data substantially complies with the required information; and
    the data repository database programmed with a set of instructions for storing the data necessary to document the communications between the broker side server and the one or more client computers.

2. The computer system of claim 1 wherein the plurality of unique customer request categories comprises recommendations.

3. The computer system of claim 2 wherein recommendations further comprise a category for recommendations with a solicited trade placed.

4. The computer system of claim 1 wherein the communications between the broker side server and the one or more client computers comprise buy or sell recommendations.

5. The computer system of claim 1 wherein the communications between the broker side server and the one or more client computers comprise a basis for making buy or sell recommendations.

6. The computer system of claim 1 wherein the broker side server comprises an advice tracking program executable by the one or more client computers, wherein the advice tracking program comprises instructions for:
    selecting customer interaction records stored in the database; and
    reviewing the selected customer interaction records.

7. The computer system of claim 6 wherein the selected customer interaction records are reviewed to monitor compliance with trading regulations.

8. The computer system of claim 6 wherein the advice tracking program further comprises instructions for:
    searching the customer interaction records stored in the database according to one or more parameters; and
    presenting the customer interaction records that satisfy the one or more parameters.

9. The computer system of claim 1 wherein the data repository database stores the data using at least one of the following categories: customer, prospect, or organization.

10. The computer system of claim 1 wherein the set of instructions further comprises creating an assessment record for a customer.

11. A method for tracking regulatory governed communications between a securities broker and one or more clients, comprising:
    facilitating communication between a broker side server, a data repository database, and one or more client computers, the broker side server programmed with a set of instructions comprising
        generating a client side interface, the client side interface including a plurality of unique customer request categories,
        receiving one or more selections from the plurality of customer request categories,
        determining data necessary to document the communications between the broker side server and the one or more client computers,
        retrieving the data necessary to document the communications between the broker side server and the one or more client computers,
        verifying if the retrieved data substantially complies with required information, and
        repeating the retrieving step until the data substantially complies with the required information; and
    storing the data necessary to document the communications between the broker side server and the one or more client computers in the data repository database.

12. The method of claim 11 wherein the plurality of unique customer request categories further comprises recommendations.

13. The method of claim 12 wherein recommendations further comprise a category for recommendations with a solicited trade placed.

14. The method of claim 11 wherein the communications between the broker side server and the one or more client computers comprise buy or sell recommendations.

15. The method of claim 11 wherein the communications between the broker side server and the one or more client computers comprise a basis for making buy or sell recommendations.

16. The method of claim 11 wherein the broker side server further comprises an advice tracking program executable by the one or more client computers, wherein the advice tracking program comprises instructions for:
   selecting customer interaction records stored in the database; and
   reviewing the selected customer interaction records.

17. The method of claim 16 wherein the selected customer interaction records are reviewed to monitor compliance with trading regulations.

18. The method of claim 16 wherein the advice tracking program further comprises instructions for:
   searching the customer interaction records stored in the database according to one or more parameters; and
   presenting the customer interaction records that satisfy the one or more parameters.

19. The method of claim 11 wherein the data repository database stores the data using at least one of the following categories: customer, prospect, or organization.

20. The method of claim 11 wherein the set of instructions further comprises creating an assessment record for a customer.

* * * * *